United States Patent [19]

Bowen et al.

[11] Patent Number: 5,648,900

[45] Date of Patent: Jul. 15, 1997

[54] METHOD AND APPARATUS FOR CONTROLLING AND MONITORING GROUP TRAVEL RELATED SERVICES

[75] Inventors: James D. Bowen, Aurora; Allyson J. Henry, Highlnds, both of Colo.; Mark J. Meier, Carrollton, Tex.; Linda S. Postlethwait, Englewood; Steven W. Schrimp, Denver, both of Colo.

[73] Assignee: Galileo International Partnership, Rosemont, Ill.

[21] Appl. No.: 657,730

[22] Filed: Feb. 20, 1991

[51] Int. Cl.⁶ ............................................. G06F 17/60
[52] U.S. Cl. ................................ 395/205; 395/601
[58] Field of Search ................................. 364/400, 401, 364/407; 395/600, 200

[56] References Cited

U.S. PATENT DOCUMENTS

| | | |
|---|---|---|
| 3,705,384 | 12/1972 | Wahlberg . |
| 4,186,438 | 1/1980 | Benson et al. . |
| 4,775,936 | 10/1988 | Jung ........................... 364/407 R |
| 4,862,357 | 8/1989 | Ahlstrom et al. . |
| 4,922,439 | 5/1990 | Greenblatt .................. 364/407 R |
| 4,931,932 | 6/1990 | Dalnekoff et al. . |
| 4,939,689 | 7/1990 | Davis et al. . |
| 5,021,953 | 6/1991 | Webber et al. ............. 364/407 R |
| 5,070,470 | 12/1991 | Scully et al. . |
| 5,124,912 | 6/1992 | Hotaling et al. ........... 364/401 R |
| 5,193,152 | 3/1993 | Smith . |
| 5,206,951 | 4/1993 | Khoyi et al. . |
| 5,226,117 | 7/1993 | Miklos . |

OTHER PUBLICATIONS

Tom (Travel Office Management) by Agency Management Services, 1988.
Travel Weekly, v49, N70, p. 520 Aug. 30, 1990.
International Application Published Under the Patent Cooperation Treaty (PCT); WO 86/00735; 30 Jan. 1986.

*Primary Examiner*—Robert A. Weinhardt
*Assistant Examiner*—George N. Stevens
*Attorney, Agent, or Firm*—Arnold, White & Durkee

[57] ABSTRACT

A computerized reservation system including controlling and monitoring of group travel related services is presented. In addition to master inventory of travel related services and a set of passenger name records which correlate individuals with reserved travel related services from the master inventory, the present invention uses a group control record which includes a group inventory which is a subset of the master inventory, and a number of group related passenger name records, which are a subset of the general passenger name records. When changes are made to any one of the master inventory, group control records or group passenger name records, appropriate changes are automatically made in the others of these three. Thus, the monitoring and controlling of group travel related services is greatly facilitated.

14 Claims, 22 Drawing Sheets

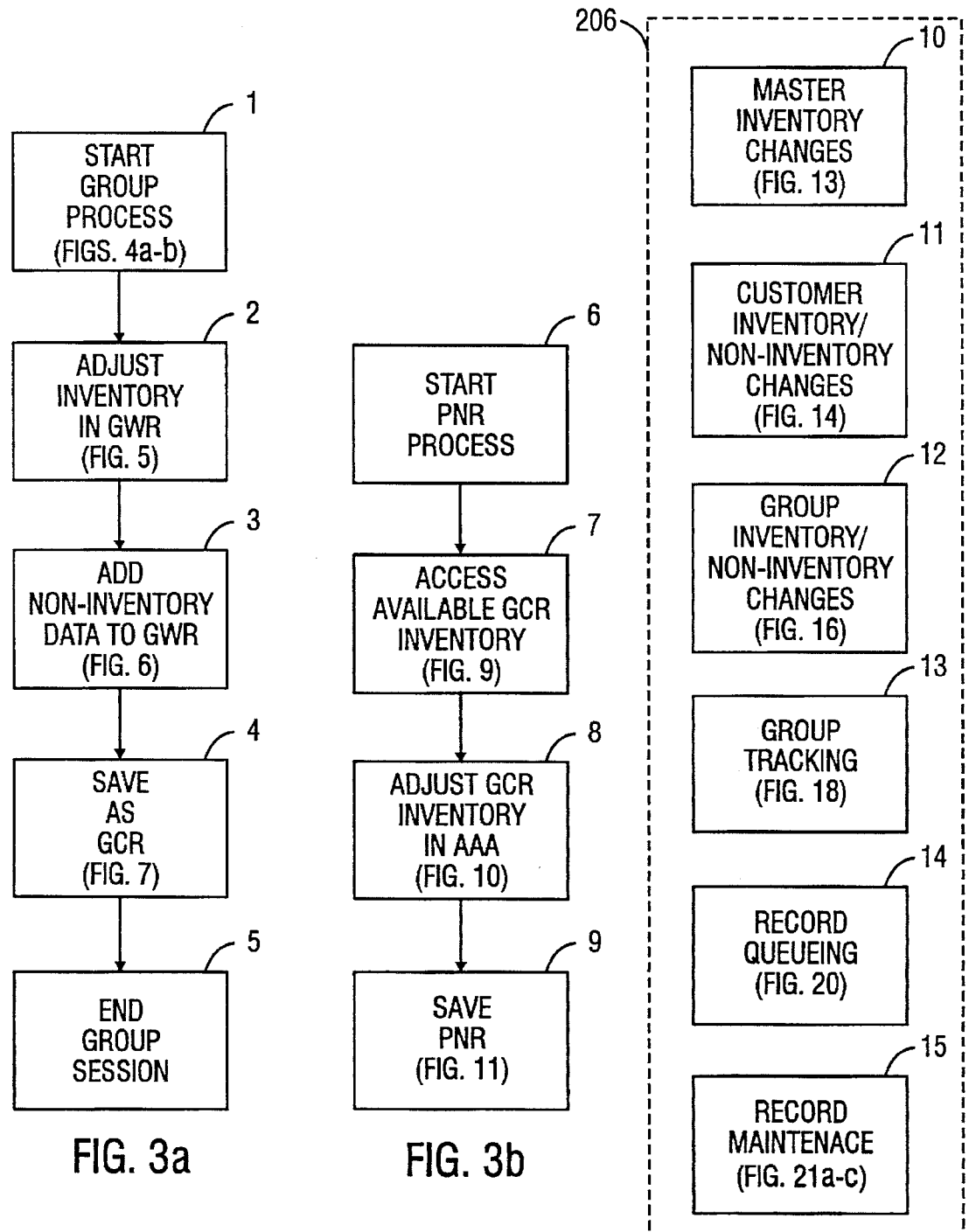

METHOD AND APPARATUS FOR CONTROLLING AND MONITORING GROUP TRAVEL RELATED SERVICES

BACKGROUND OF INVENTION

The invention relates to a data processing method and apparatus for group travel related services which provides the ability for group information to cross reference and update both master inventory data and customer detail information, and the ability to update group information by actions taken on either master inventory or customer detail information.

BACKGROUND

In today's travel environment, passengers have become more conscious of the benefits of group travel arrangements. This has resulted in increased demand for handling groups, for example, the scheduling and reservation of transportation, lodging and activities for the group.

At present, group travel arrangements are accomplished by a group wholesaler manually maintaining records of a particular group offering. In addition, some host-providers, for example airlines, have offered blocking of passenger name records. The blocked passenger name records are then made available to a limited number of wholesalers. When a passenger name record in the block is canceled, the represented space is returned to the block unless the block has been canceled, in which case the space returns to master inventory.

However, this type of blocked passenger name record is not released to a wholesaler when handling because the merging of the travel segments is required to be performed by the host-provider. The wholesaler therefore has little or no control over this type of blocked passenger name record other than advising the host provider which travel segments a particular passenger desires. In addition, this requires that each of the travel segments that together constitute a group travel offering must be stored in a separate blocked passenger name record.

The required control by the host-provider of these prior blocked passenger name records has greatly limited the flexibility offered to wholesalers of group travel related services.

Therefore, a system that provides a flexible vehicle for handling group travel related services with provisions for accessing and updating both master inventory and customer detail information for groups, would be desirable.

SUMMARY OF THE INVENTION

The present invention avoids the above-noted drawbacks of the prior art and enables wholesalers and retailers of inventory of travel related services to more easily track groups. The invention provides a block inventory application that enables the users to house all pertinent inventory information for a specific group in one record, the Group Control Record. The group blocked inventory and associated information will be kept in a Group Control Record while group related Passenger Name Records, referenced by the Group Control Record will be used for the individual passenger itinerary and information. According to the present invention, the wholesaler blocks a host provider's inventory into a Group Control Record for a group and the retailer sells inventory from the Group Control Record into group related Passenger Name Records for individual passengers. The present invention will maintain the relationship between the host inventory, the Group Control Record and the group related Passenger Name Records when any changes are made to any of these elements.

More specifically, when using the present invention a wholesaler of group related services creates a Group Control Record including a group inventory of all travel segments required to constitute the group travel. As group inventory is sold, group related Passenger Name Records are created and indexed within the Group Control Record. Each created group related Passenger Name Record contains a reference to the Group Control Record from which the inventory was obtained. Thus, changes to master inventory can be automatically reflected in the group inventory of the relevant Group Control Records, and can be automatically reflected in the group related Passenger Name Records of the affected Group Control Records. In addition, cancellations of group related Passenger Name Records return inventory to the group inventory of the relevant Group Control Record.

Group final dates can also be established for the return of unused inventory to master inventory upon the expiration of specified dates.

Creation of a Group Control Record by a wholesaler of travel-related services is facilitated in the present invention by use of a Group Work Record which includes empty data fields relevant to group travel services. After the wholesaler has filled the fields of a Group Work Record with data relating to a particular group offering, and after that data has been checked, data fields in the Group Work Record are stored in corresponding data fields of a Group Control Record. Further access to the data fields of the Group Control Record can be limited to that particular wholesaler. While other agents related to the wholesaler can sell inventory from the Group Control Record, other Group Control Record changes are prohibited.

A more complete understanding of the above and other features and functions of the present invention can be had with reference to the following detailed description of the preferred embodiment, and to the accompanying drawings.

BRIEF DESCRIPTION OF THE DRAWINGS

FIGS. 3a, 3b and 3c are flowcharts showing the overall operation of the present invention.

FIGS. 4a and 4b are flowcharts depicting in greater detail the start group process step of FIG. 3a.

FIG. 5 is a flowchart depicting in greater detail the adjust inventory in GWR step of FIG. 3a.

FIG. 6 is a flowchart depicting in greater detail the add non-inventory data to GWR step of FIG. 3a.

FIG. 7 is a flowchart depicting in greater detail the save as GCR step of FIG. 3a.

DETAILED DESCRIPTION OF THE PREFERRED EMBODIMENT

A. Definitions

Figure 1:
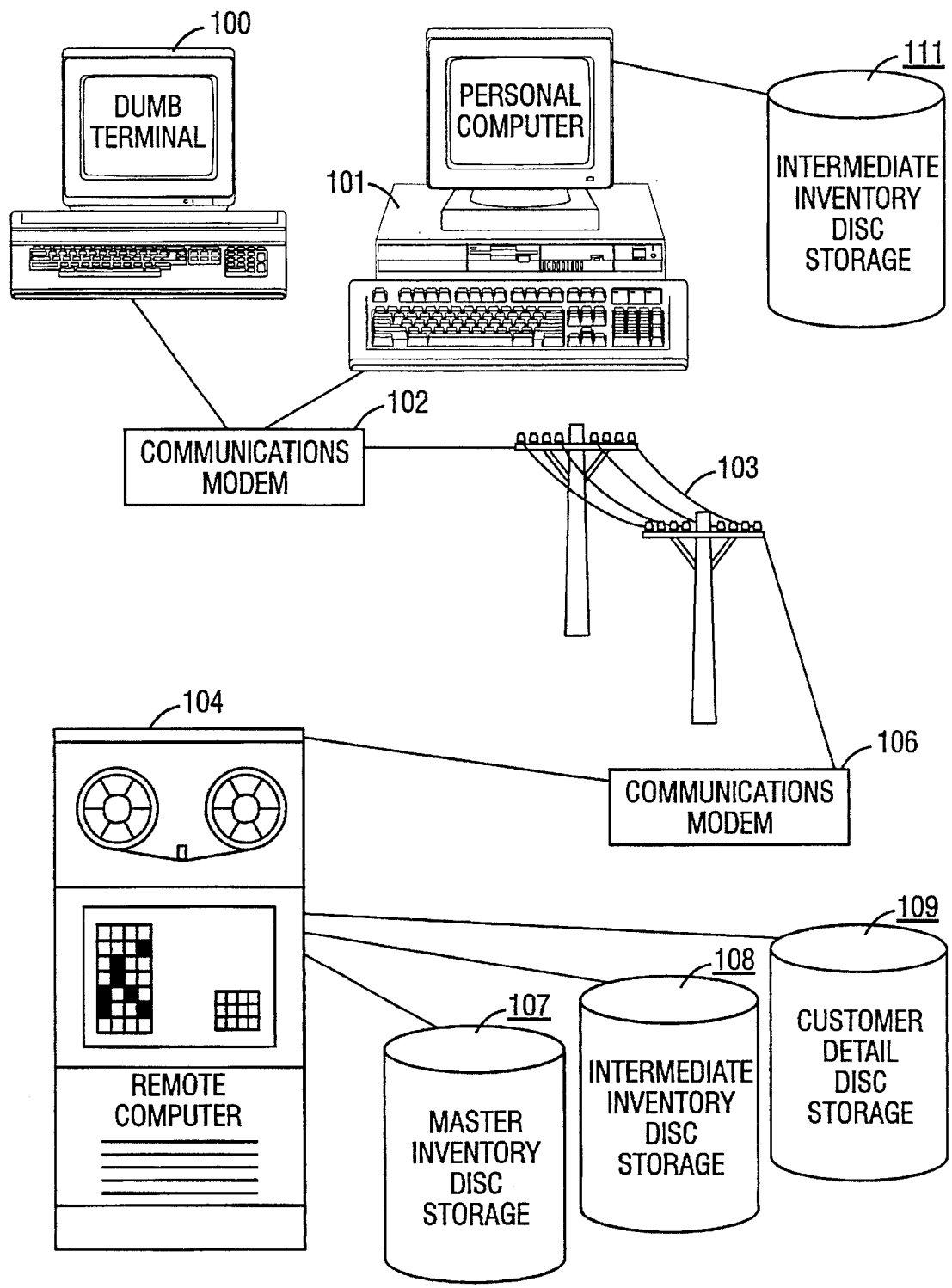
FIG. 1 is a schematic view of a hardware system in accordance with the present invention.

AAA: Agent Assembly Area. This record is an industry standard for use in facilitating any agent activity on a reservation system, including creation and update of PNRs. PNR fields are unpacked into the AAA. With the present invention, new fields are added to the AAA. A reference to a GWR is added to the AAA and a flag is set when an agent is authorized to use the group related services of the present invention.

Agent: Any operator of the system.

DXA: Deferred Cancellation Area. The DXA is a record associated with the AAA, which will contain updated inventory and name data for a PNR contained in the AAA. This inventory and name data is used to maintain master inventory and PNR history when the PNR transaction is completed.

GCR: Group Control Record. The GCR typically includes the following information fields:

| ACTION | FIELD | DESCRIPTION |
| --- | --- | --- |
| GID | Ownership of GCR | Wholesaler ID of the GCR owner |
| N: | Group Name | Title of the GCR |
| R: | Received | Received from - the GCR builder |
| W-addr | Wholesaler Address | Wholesaler address |
| D-addr | Delivery Address | Delivery address of GCR agent |
| L: | Record Locator | Other airline record locator |
| P: | Phone Field | Phone number of GCR agent |
| @:3 | SSR - Special Service Request | Follows standard SSR conventions |
| 0 | Inventory information | Inventory item obtained from master inventory |
| FINAL | Inventory Final Return Date | Date contained in the inventory item on which unused inventory must be returned to provider |
| GRPT | Inventory Group Tracking (Penalty) Date(s) | Date(s) contained in the inventory item on which a capture of current inventory levels is desired |
| QMDR | Queue minder | A date on which the GCR is to be queued |

GCR History: Record referenced out of the GCR containing audit trail information relating to modification made to the GCR information.

GRID: Group Detail Index Record. The GRID contains references to GCRs that are related by host provider flight and date.

GRIX: Group Control (owner specific) Index Record. The GRIX contains references to all GCRs that are owned by a wholesaler.

Group Operator: Owner and organizer of a group travel offering, reflected by a GCR, for example, an agency, a wholesaler or an airline.

GRPT/FINAL Index Record: Contains References to GCRs that require action on a specific date contained in the GCR inventory item.

GWR: Group Work Record. The GWR is a temporary record that contains the same fields as the GCR at fixed locations in contrast to the GCR, which holds data at variable locations.

GXA: Group Deferred Cancellation Area. The GXA is a record associated with the GWR which will contain updated inventory and name data for a GCR contained in the GWR. This inventory and name data is used to maintain GCR inventory and GCR history when the GCR transaction is completed.

Host Provider: The holder of master inventory.

PNID: Passenger Name Index Detail Record. The PNID contains references to PNRs that are related by host provider flight and date. In this invention, the PNID contains a reference to the GRID, for GCRs related to this host provider flight and date.

PNR: Passenger Name Record. A PNR typically includes but is not limited to the following industry standard information: passenger name, agent name, ticketing information, telephone number field and inventory information. In addition, the PNR used in the present invention includes a reference to the GCR from which inventory was obtained.

QCR: Queue Control record. The QCR allows queuing of the GCR for a specific wholesaler.

Queue Prompt Index Record: Contains References to GCRs that are to be placed in a queue on a specific date contained in the QMDR field of a GCR.

Sub-PNR index: This record contains a reference to each Sub-PNR that contains inventory obtained from a specific GCR inventory item.

Sub-PNR or Group Related PNR: A PNR that contains inventory obtained from a GCR.

WIT: Wholesaler Identification Table. The WIT contains references to specific wholesaler (group operator) psuedo-cities that are authorized to function within the present invention. The WIT also references the GRIX records for a wholesaler.

B. Description

Referring to FIG. 1, the group travel related services monitoring system of the present invention is disclosed. In general, the system includes a number of computer terminals 100, 101, which are typically located in travel agencies or the like, and which are connected to access a remote reservation system computer 104. Remote computer 104, which is connected to storage devices 107, 108 and 109, maintains an inventory of travel services, for example, transportation services such as airline, train and cruise schedules, lodging accommodations, rental cars, and the like. It should be noted that inventories of travel related services other than those listed can be maintained by remote computer 104, without departing from the scope of the present invention.

In the preferred embodiment, remote computer 104 is the Apollo computerized reservation system maintained and operated by the Covia Partnership.

Remote computer 104 can be, for example, any commercially available computer or collection of computers such as, for example, IBM models 3090-400J, 3090-400E, 9190-200 or 9081-K32. Storage units 107, 108 and 109 are preferably high density magnetic disk storage units, however, other types of storage can be used, for example, optical disk, tape or semiconductor memory. Storage unit 107 is used to store master inventory of, for example, available airline flights. Storage unit 108 is used to store intermediate inventory, defined herein as the GCR. Storage unit 109 is used to store customer detail information including PNRs and related indices.

Although storage units 107, 108 and 109 are shown as separate units, this is for illustrative purposes only and it should be understood that the information stored in storage units 107, 108 and 109 may in fact be maintained in different areas within a single unit, or within several physically different storage units. Storage units 107, 108 and 109 can be, for example, IBM model 3380 units.

Remote computer 104 communicates through a communications channel, for example, modem 102, telephone lines 103 and modem 106, to computer terminals 100 and 101. Communications channels other than telephone communications, for example, radio, microwave, satellite or optical link, can be used without departing from the present invention. In addition, although only one local network (computers 100 and 101, modem 102 and storage unit 111), is illustrated, it will be understood that any number of local networks can be used with each communicating with remote computer 104.

Computer terminals 100 and 101 can be any type of computer. For example, computer 100 can be a non-programmable computer, or so-called "dumb terminal", such as Incoterm models 1501 or 1503. On the other hand, computer 101 can be a fully programmable computer such as, for example, IBM models PS/2 50, 60, 65, 70 or 80, with micro-channel architecture. Storage unit 111 similar to storage units 107, 108 and 109, is preferably a magnetic disk storage unit but can be other types of data storage. Storage unit 111 is used to store intermediate inventory, contained in the GCRs, which is used in combination with computer 101 to practice the present invention, as described in more detail below.

Figure 2:
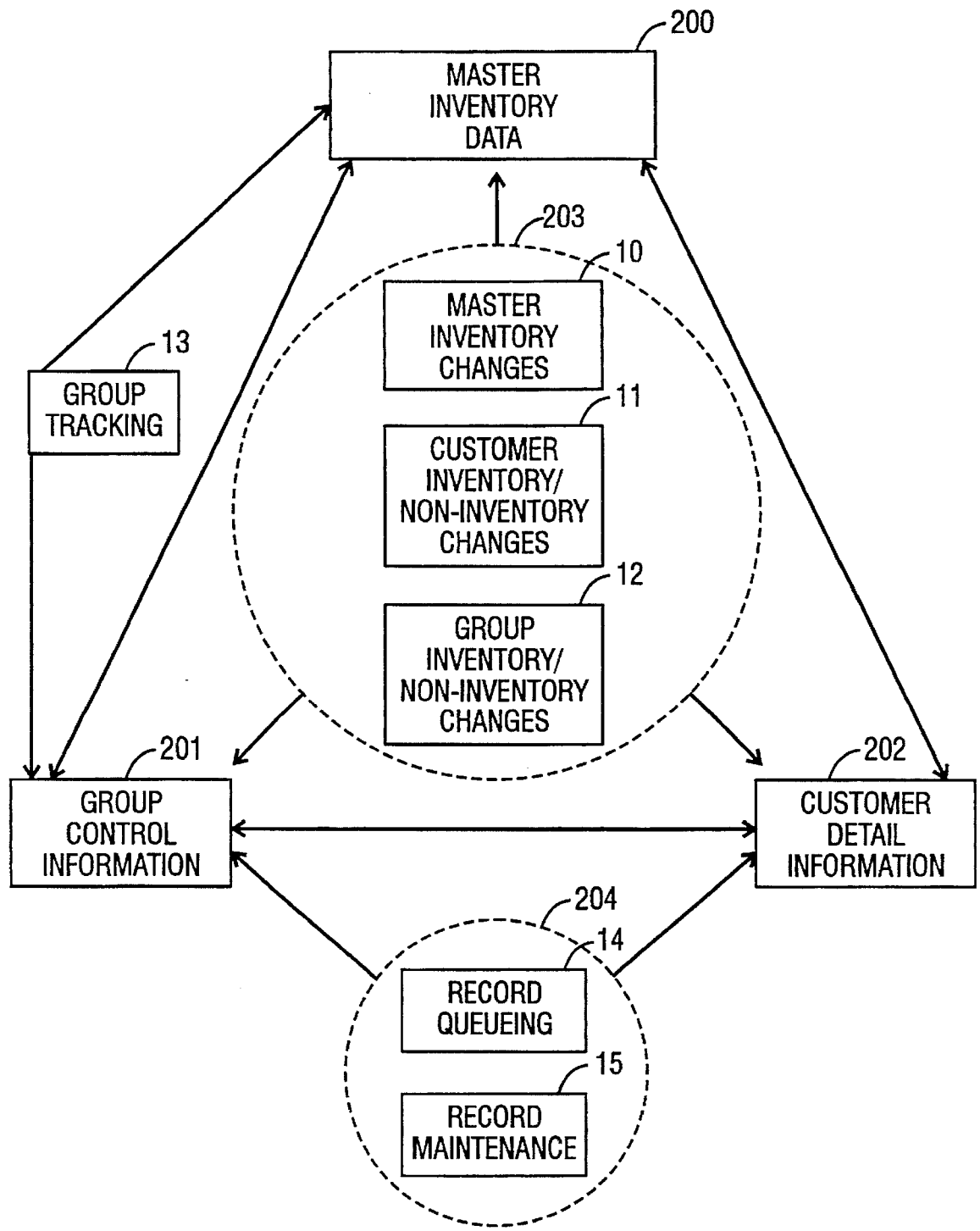
FIG. 2 is a block diagram data/process relationship between the processes in the steps of FIGS. 3a–c.

Referring now to FIG. 2, shown is a conceptual representation of the interaction of data, and processes affecting data, according to the present invention. In general, three separate stores of information are maintained, master inventory data 200, group control information 201 and customer detail information 202.

The process elements contained within dashed circle 203 are processes that update or access all group information including master inventory data 200, group control information 201 (including GCRs) and customer detail information 202 (including PNRs). The processes within dashed circle 203 include: master inventory changes 10 (described in detail with reference to FIG. 13), customer inventory/non-inventory changes 11 (described in detail with reference to FIGS. 14 and 15a–e), and group inventory/non-inventory changes 12 (described in detail with reference to FIGS. 16 and 17a–c). On the other hand, the process elements contained within dashed circle 204 affect only group control information 201 and customer detail information 202. The processes within dashed circle 204 include: record queuing 14 (described in detail with reference to FIG. 20), and record maintenance 15 (described in detail with reference to FIGS. 21a–c). Similarly, group tracking 13 (described in detail with reference to FIGS. 18 and 19), affects only group control information 201 and master inventory data 200.

The data flow lines connecting master inventory data 200, group control information 201 and customer detail information 202 indicate that all group information (items 200, 201 and 202), may be affected by any change to other group information. In addition, indicated is the fact, according to the present invention, all group information references other group information.

Referring now to FIGS. 3a–c, the operation of the present invention is presented in flowchart form. A computer program embodying the functions disclosed in the flowchart of FIGS. 3a–c, and described in more detail in subsequent figures, can be written and loaded into the computers shown in FIG. 1 to accomplish the present invention. It should be noted that when remote computer 104 is used in combination with non-programmable computer 100, the computer program embodying the processes of the present invention would reside within remote computer 104. However, when computer 104 is used in combination with programmable computer 101, the computer program embodying the processes of the present invention could reside in either computer 101 or computer 104, or the programming could be shared between computer 101 and computer 104, without departing from the present invention.

Referring to FIG. 3a, depicted are the processes which are used to create a GCR. In step 1, a session is initiated by an Agent. Inventory and non-inventory data can be added to a GWR by an Agent in steps 2 and 3. The GCR can be saved by the Agent once required data has been added to the GWR in step 4, and the group session may be ended in step 5.

Figure 4A:
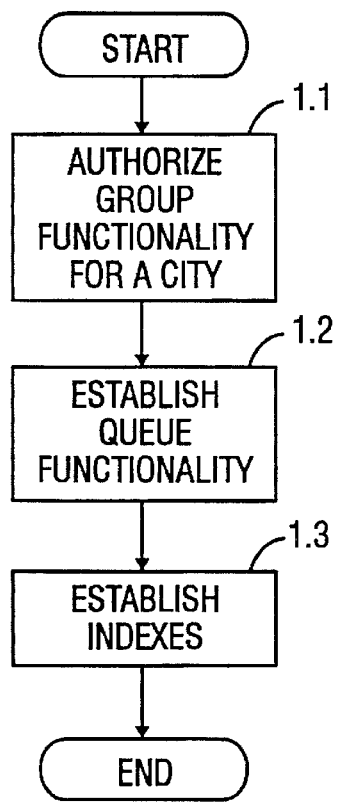
Figure 4B:
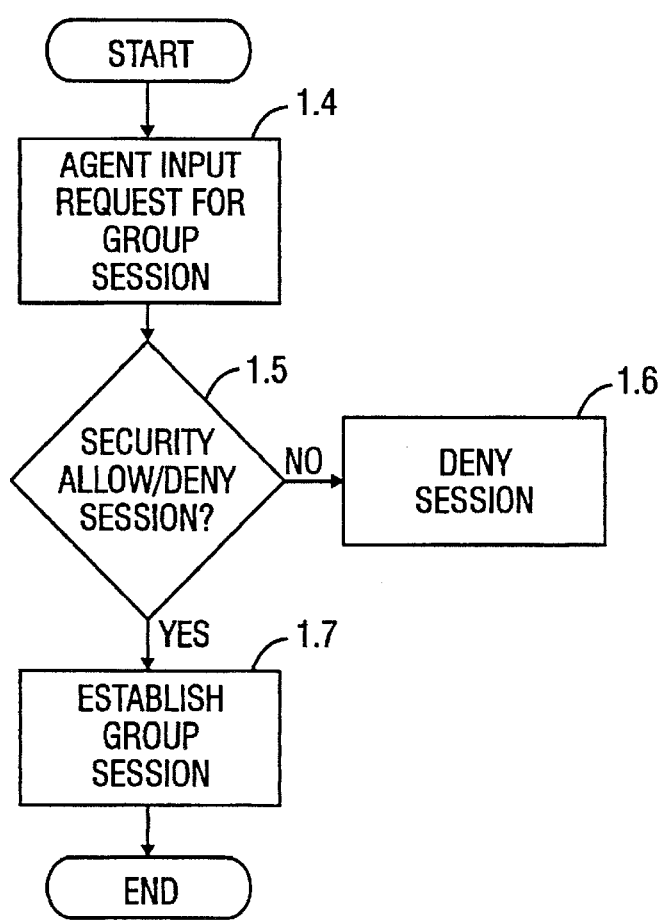

The start group process step 1 of FIG. 3a is set out in greater detail in FIGS. 4a and 4b. Referring to FIG. 4a, in step 1.1 an Agent inputs data related to a Group Operator via a functional entry through a keyboard, or the like. This data includes city information, Group Operator identifier and billing information. In steps 1.2 and 1.3 the data related to the Group Operator is placed in the data base index records. These index records include the WIT and the QCR. The Group Operator identification is added to the WIT record and the QCR for that Group Operator is initialized. During other processes, these indices provide for Group Operator authorization, queuing functionality, and GCR access. In FIG. 4b, the establishment of a group session is accomplished. Specifically, in step 1.4, an Agent inputs a functional entry to attempt to establish a group session. This action causes an access to the data base to verify authorization for this Agent in step 1.5. This authorization is accomplished by searching for the Group Operator identifier within the data base. Group session authorization will be denied or allowed depending upon the data base updates accomplished previously in steps 1.1–1.3 (FIG. 4a). If the group session is denied, the Agent is notified in step 1.6. If a group session is established successfully, a GWR is obtained for the Agent in step 1.7.

Figure 5:
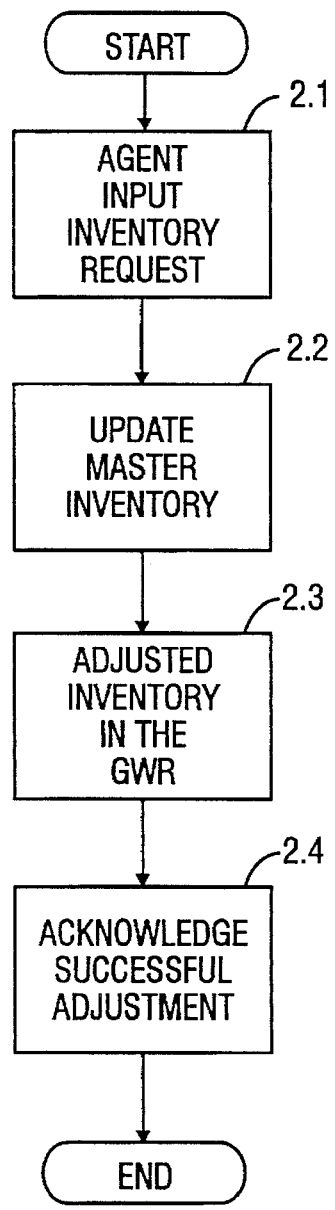

Referring once again to FIG. 3a, the adjust inventory in GWR (step 2) is set out in greater detail in FIG. 5. Referring to FIG. 5, in step 2.1, an Agent inputs a request to acquire or return inventory, supplying, for example, a city pair and date as input. In steps 2.2 and 2.3, when acquisition of inventory is requested, inventory is removed from master inventory and placed into the GWR. On the other hand, in steps 2.2 and 2.3, when a request for return of inventory is entered, inventory is removed from the GWR and placed back into master inventory. The Agent is then notified of a successful acquisition or return of inventory in step 2.4.

Figure 6:
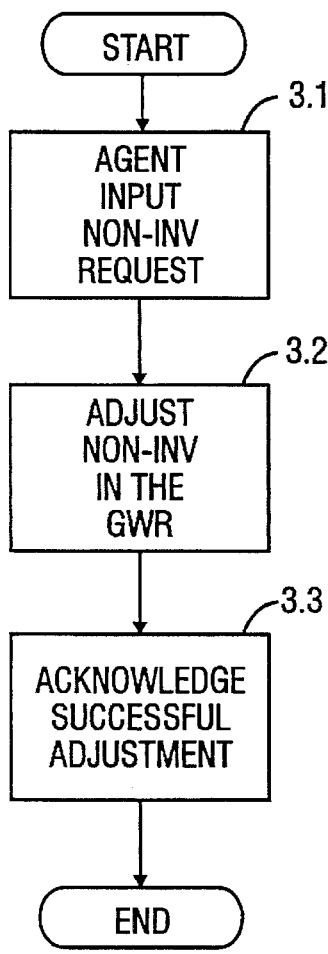

The details of step 3 (add non-inventory data to GWR) are set out in greater detail in FIG. 6. Referring to FIG. 6, in step 3.1 the Agent supplies non-inventory related information in an input request. Examples of such non-inventory related information includes, for example: group title, telephone number, remarks, delivery address, group tracking dates (GRPT), final dates (FINAL), and queue (QMDR) information.

After successful formatting and editing during the processing of the input requests, the data is placed into the GWR in step 3.2. In step 3.3, the Agent is notified of the successful addition of the non-inventory related information to the GWR.

Figure 7:
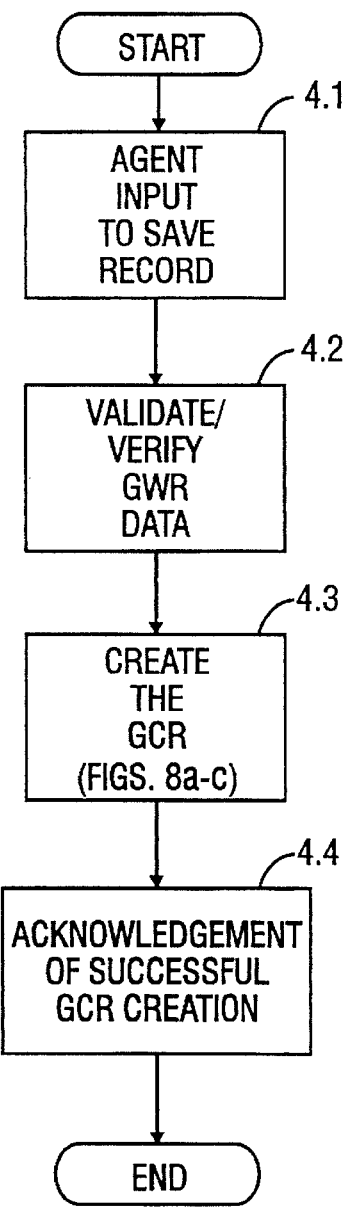

Referring once again to FIG. 3a, step 4 (save as GCR) is set out in more detail with reference to FIG. 7. Referring to FIG. 7, in step 4.1, the Agent supplies an entry to complete a GCR transaction. In step 4.2, GWR data that has been entered during the present transaction is validated and verified for proper content. Then, in step 4.3, the GWR data is transferred to create the GCR. The create GCR step 4.3 of FIG. 7 is presented in greater detail in FIGS. 8a, 8b and 8c.

Figure 8A:
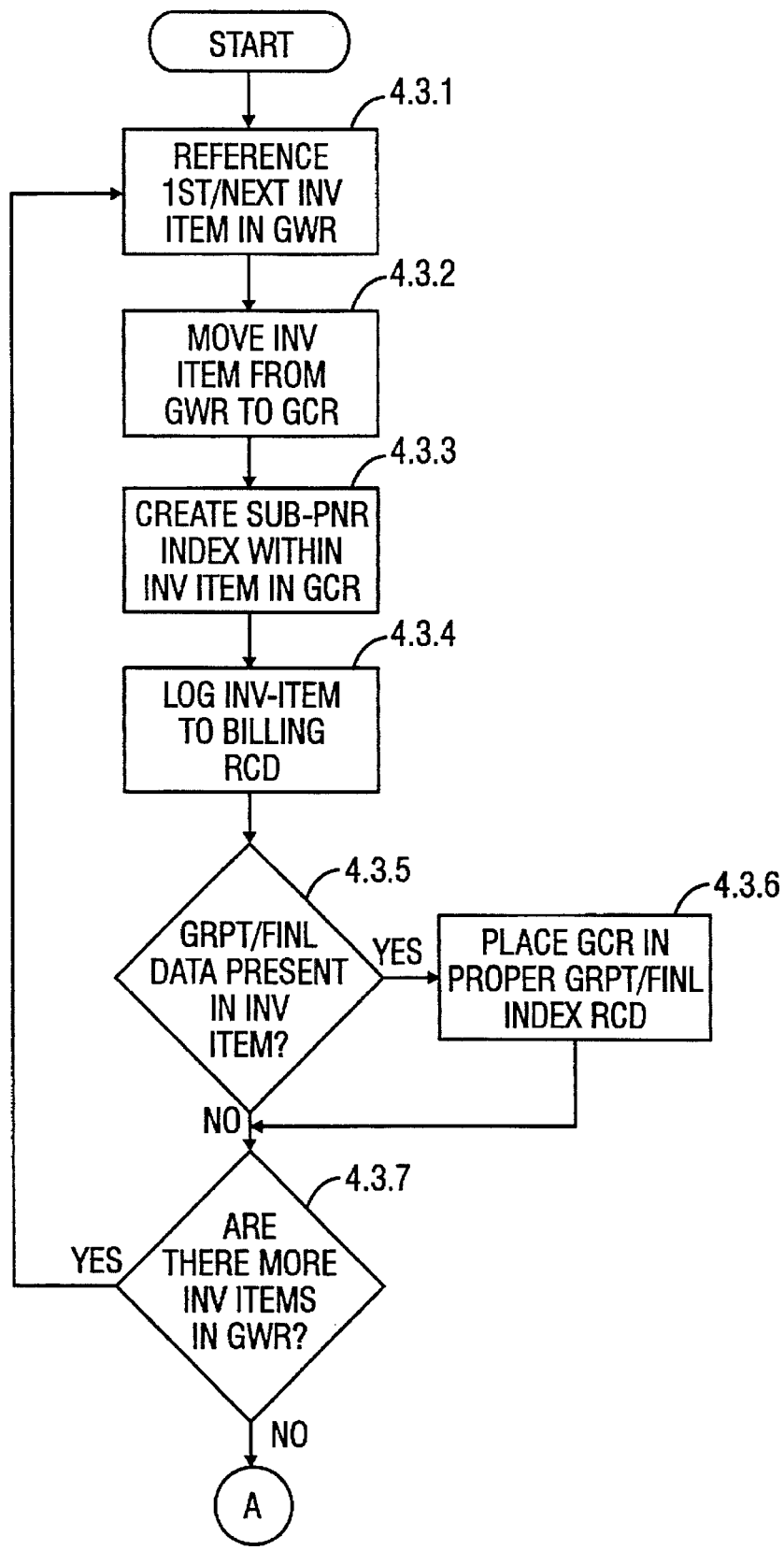
FIGS. 8a, 8b and 8c are flowcharts depicting in greater detail the create the GCR step of FIG. 7.
Figure 8B:
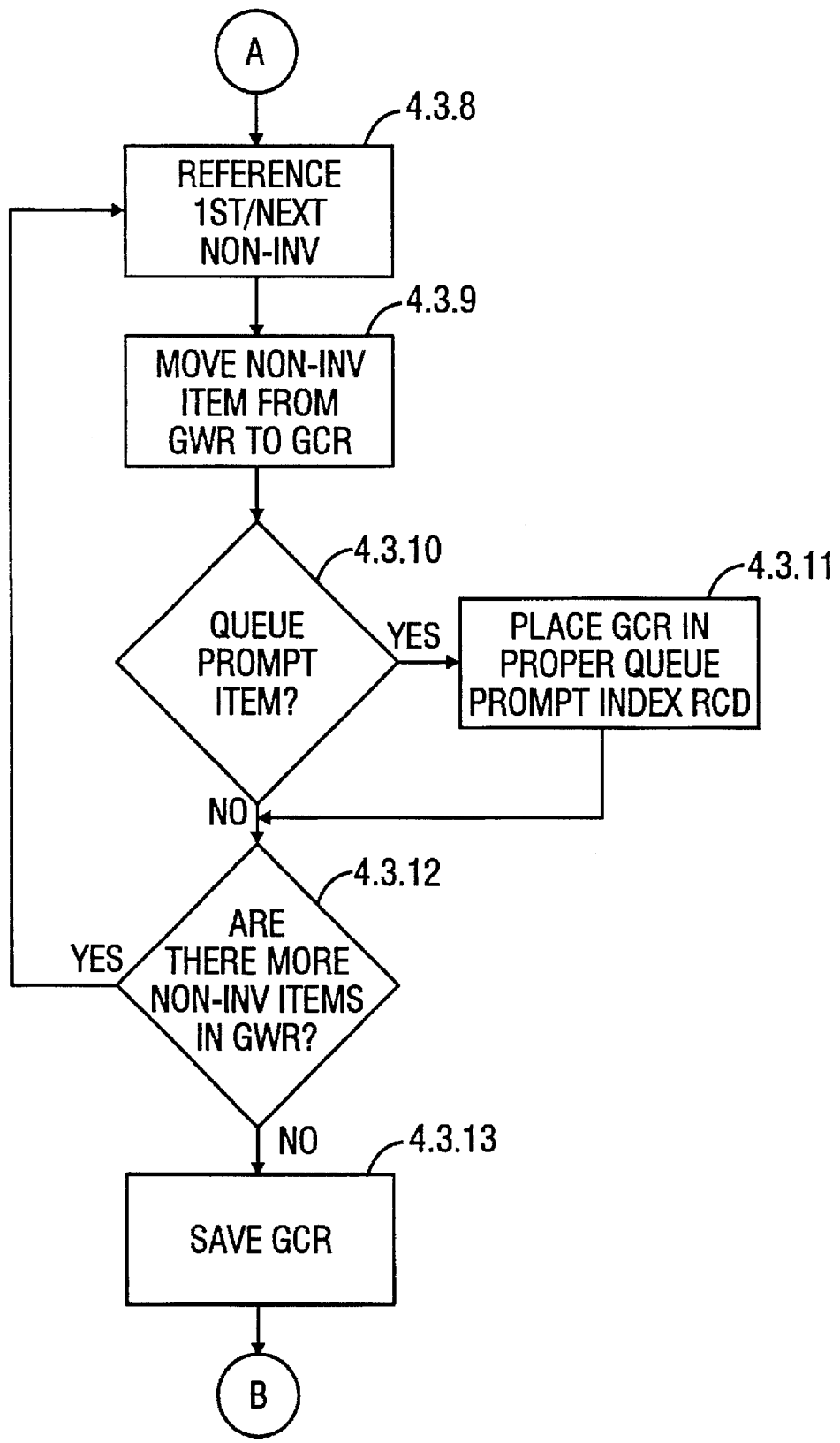
Figure 8C:
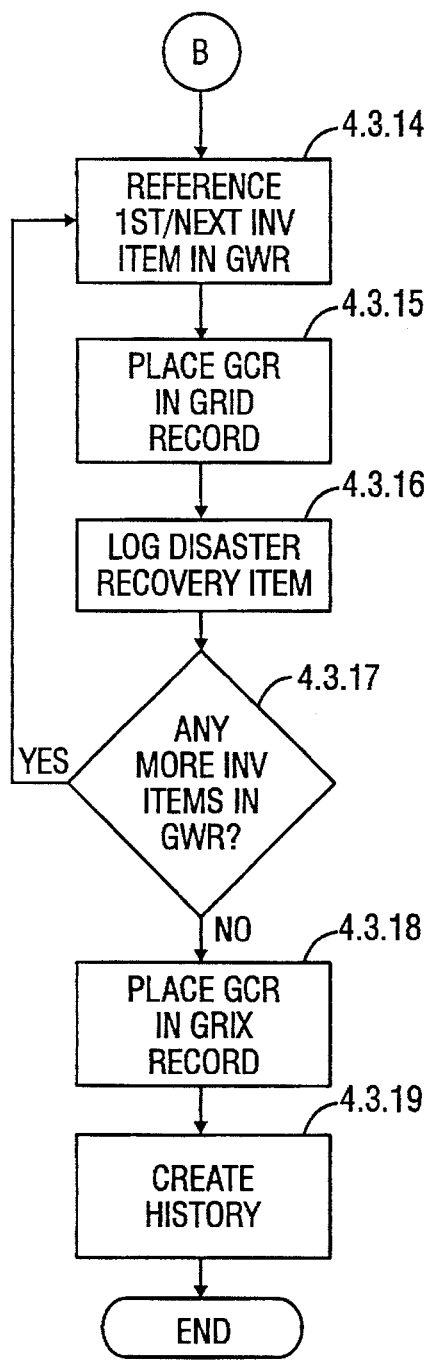

Referring to FIG. 8a, in steps 4.3.1 and 4.3.2, the transfer of the information in the GWR to the GCR is accomplished in a sequential manner, beginning with the first inventory item. As each inventory item is moved to the GCR, the Sub-PNR index is created and stored within the inventory item (step 4.3.3). The inventory item is also logged to the billing record in step 4.3.4. As the inventory item is transferred to the GCR, it is queried for the existence of group tracking or final dates (GRPT or FINAL) within the individual inventory item. If group tracking/final dates are present, as determined by step 4.3.5, then the GCR is placed in the proper GRPT/FINAL index record in step 4.3.6. If additional inventory items exist within the GWR, control is transferred back to step 4.3.1 by decision step 4.3.7.

Completion of the transfer of inventory items from the GWR to the GCR will begin the transfer of non-inventory items from the GWR to the GCR. In steps 4.3.8 and 4.3.9, each non-inventory item is transferred in a sequential manner. When queue prompt items are encountered, as determined by step 4.3.10, the GCR is placed in the proper Queue Prompt Index Record in step 4.3.11. If more non-inventory items exist within this GWR, as determined by step 4.3.12, control is transferred back to step 4.3.8 and the process is repeated. In step 4.3.13, the GCR is filed in order to complete its creation.

In step 4.3.14, inventory items in the GWR are once again queried for data required to create or locate the proper group detail index record (GRID). If a GRID is created, a reference to the GRID is placed in the proper passenger name index detail record (PNID). Step 4.3.15 then places the GCR into the GRID record. To allow for GCR recovery in the event of a possible disaster condition, minimal required GCR data is written to a logging file, per inventory item in step 4.3.16. If more inventory items exist within the GWR, as determined by step 4.3.17, control is transferred back to block 4.3.14 and the process is continued.

City information in the GWR is used to create or locate the proper group control index record (GRIX). If a GRIX is created, a reference to the GRIX is placed in the proper wholesaler identification table (WIT). The GCR is then placed into that GRIX in step 4.3.18. Records containing history of the GCR activity are created and/or maintained by way of reference in the GCR in step 4.3.19. Control is then transferred back to step 4.4 (FIG. 7) where the Agent receives notification of successful GCR creation. In step 5 (FIG. 3a) an Agent enters a functional entry to end the group session.

In normal reservation activity, PNRs are created or maintained (steps 6–9 of FIG. 3b).

Figure 9:
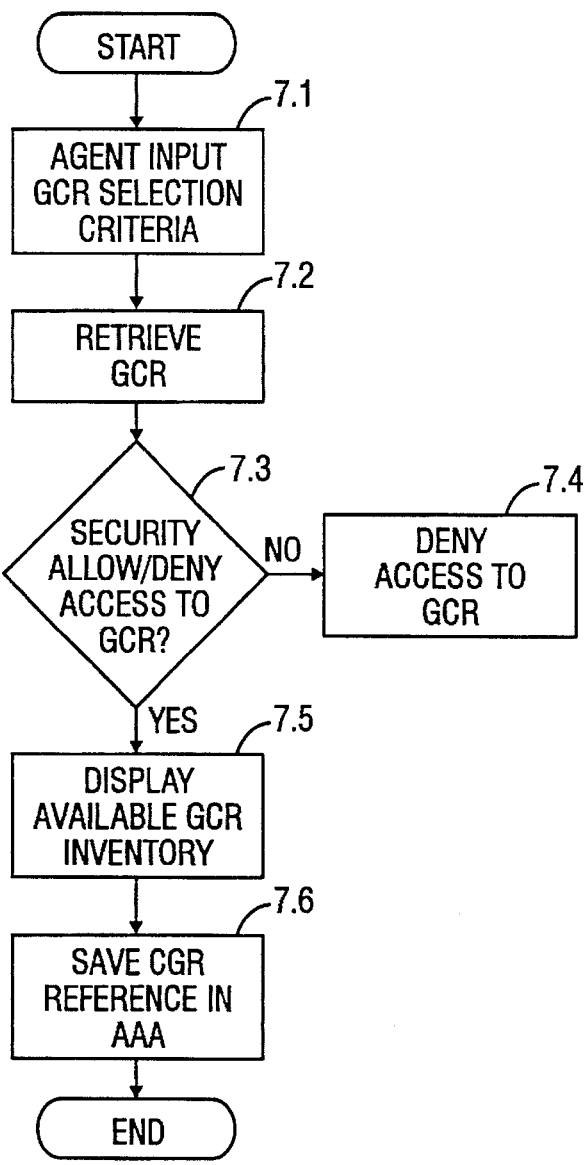
FIG. 9 is a flowchart depicting in greater detail the access available GCR inventory step of FIG. 3b.

The access available GCR inventory (step 7 of FIG. 3b) is set out in greater detail in FIG. 9. Referring to FIG. 9, in step 7.1, the Agent inputs a code unique to a GCR. The location of the GCR is derived from this code, allowing the GCR to be retrieved in step 7.2. The GCR ownership city data contained in the GCR is compared to the city of the retrieving Agent in step 7.3. If the cities do not match, access to the GCR is denied and an appropriate message is given to the Agent in step 7.4. If step 7.3 determines that the cities match, the GCR is made available to the PNR process to format a display of inventory from the GCR (step 7.5). In step 7.6, a reference to the GCR is saved in the AAA for use in future retrievals of the GCR for inventory updates.

Figure 10:
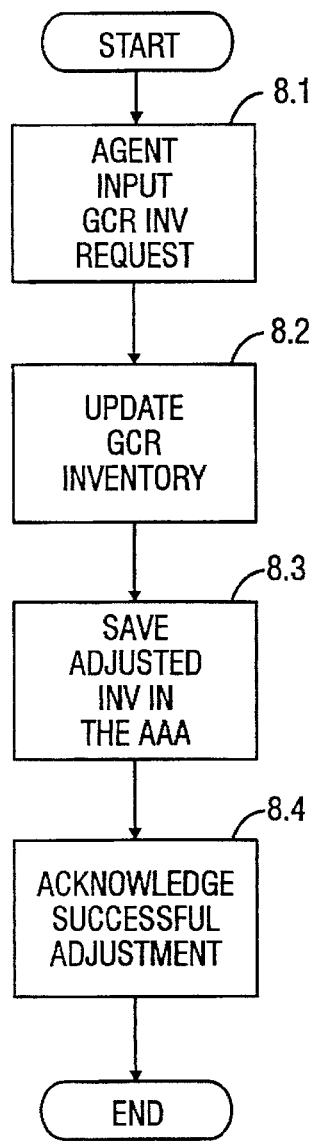
FIG. 10 is a flowchart depicting in greater detail the adjust GCR inventory in AAA step of FIG. 3b.

Step 8 of FIG. 3b (adjust GCR inventory in AAA) is set out in greater detail in FIG. 10. Referring to FIG. 10, in step 8.1, the Agent inputs a request to move specific inventory items from the GCR to the PNR. Each inventory item in the GCR is decremented by the amount moved to the PNR and the updated GCR is filed in step 8.2. The GCRs unique code is saved in the related inventory item(s) in the PNR in step 8.3. Finally, in step 8.4, the Agent receives notification of successful AAA (unpacked PNR fields) adjustment.

Figure 11:
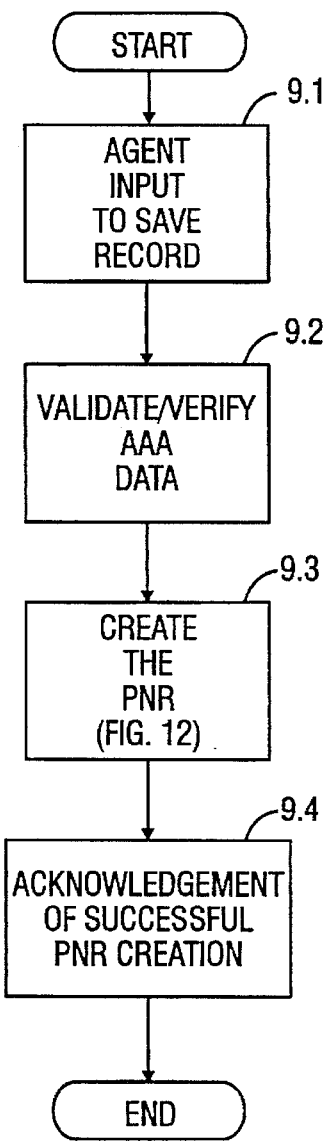
FIG. 11 is a flowchart depicting in greater detail the save PNR step of FIG. 3b.

The save PNR step 9 of FIG. 3b is set out in greater detail in FIG. 11. Referring to FIG. 11, in step 9.1, the Agent supplies an entry to complete a PNR transaction. AAA data that has been entered during this transaction is validated and verified for proper content in step 9.2. The AAA data is then transferred to a PNR in step 9.3.

Figure 12:
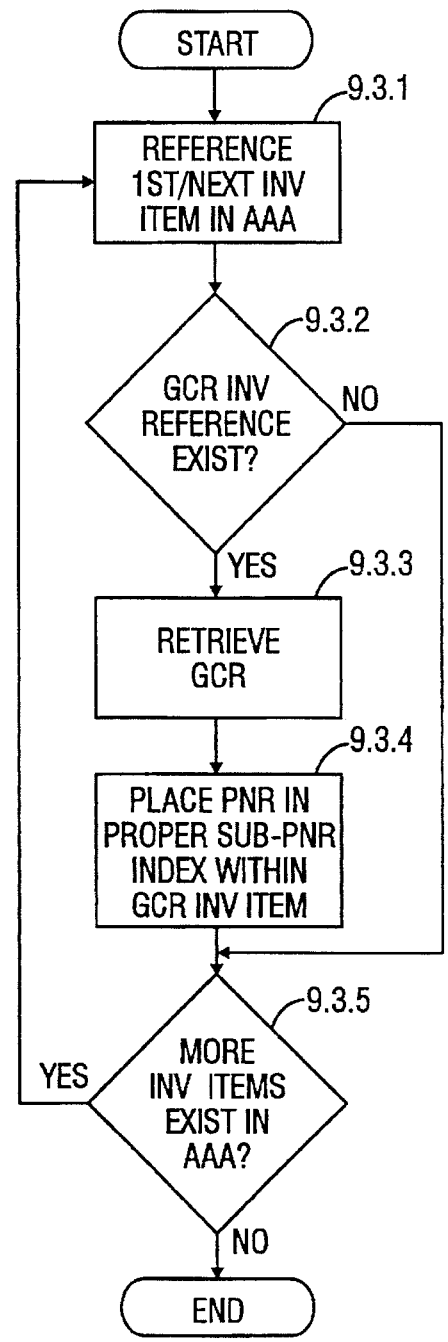
FIG. 12 is a flowchart depicting in greater detail the create the PNR step of FIG. 11.

The create PNR step 9.3 of FIG. 11 is set out in greater detail in FIG. 12. Referring to FIG. 12, in step 9.3.1, transfer of inventory in the AAA to the PNR is done in a sequential manner, beginning with the first inventory item. As each inventory item is moved to the PNR, the item is queried for a GCR unique code in step 9.3.2. When a code is found to exist, the appropriate GCR is retrieved in step 9.3.3. The PNR is then added to the Sub-PNR index contained in the appropriate GCR inventory item in step 9.3.4. If more inventory items exist within the AAA as determined by step 9.3.5, control is transferred back to step 9.3.1, and the process is repeated. The Agent receives notification of successful PNR creation in step 9.4 (FIG. 11).

Processes 10–15 contained within dashed block 206 of FIG. 3c are processes that relate to the monitoring and adjustment of group information. Processes 10–15 can be performed in any sequence and at any time and are therefore shown in FIG. 3c unconnected by flow lines. In addition, as mentioned above with reference to FIG. 2, processes 10, 11 and 12 can affect data in all three data stores (master inventory 200, group control information 201, and customer detail information 202), processes 14 and 15 only affect group control information 201 and customer detail information, but do not affect master inventory 200, and process 13 only affects master inventory 200 and group control information 201.

Figure 13:
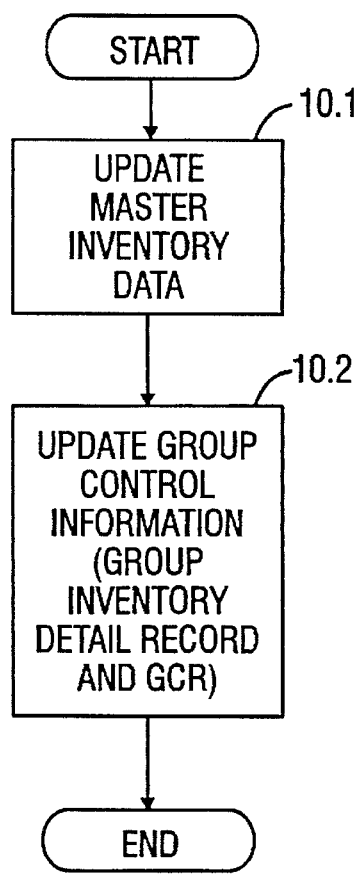
FIG. 13 is a flowchart depicting in greater detail the master inventory changes step of FIG. 3c.

Master inventory change, also known in the industry as schedule change, (step 10 of FIG. 3c) is set out in greater detail in FIG. 13. Schedule change functions include: host inventory changes; block booking, in which passenger name indices and inventory records are updated; reaccommodation, in which the PNR is updated, reflecting the old and new inventory; and queuing of affected PNRs. Referring to FIG. 13, current schedule updates (step 10.1) are cause for master inventory changes that will impact GCRs, which in turn will impact PNRs. In order to keep GCRs and PNRs in synch, in step 10.2, the GCRs are processed before the PNRs. GCR activity includes: block booking, which accesses the GRID in order to move GCRs and update inventory; reaccommodation, which accesses the GRID to work the GCR, updating the inventory in the GCR; and changed GCRs are queued to the group queue. PNRs are then processed.

Figure 14:
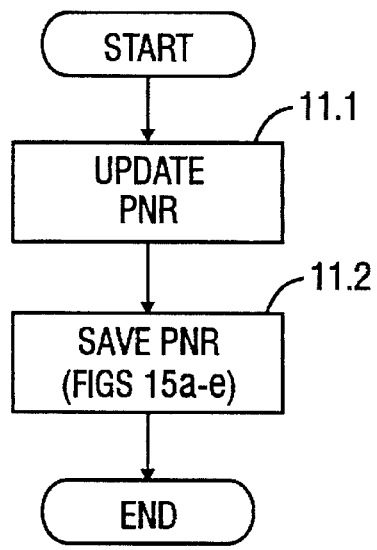
FIG. 14 is a flowchart depicting in greater detail the customer inventory/non-inventory changes step of FIG. 3c.

The customer inventory/non-inventory changes in step 11 of FIG. 3c are set out in greater detail in FIG. 14. These changes include a name change within the PNR and a sell, cancel or reduction of an inventory item sold from a GCR into the PNR. Referring to FIG. 14, in step 11.1, the PNR is either retrieved or created through normal reservations activity. In step 11.2, the Agent supplies an entry to complete a PNR transaction.

Figure 15A:
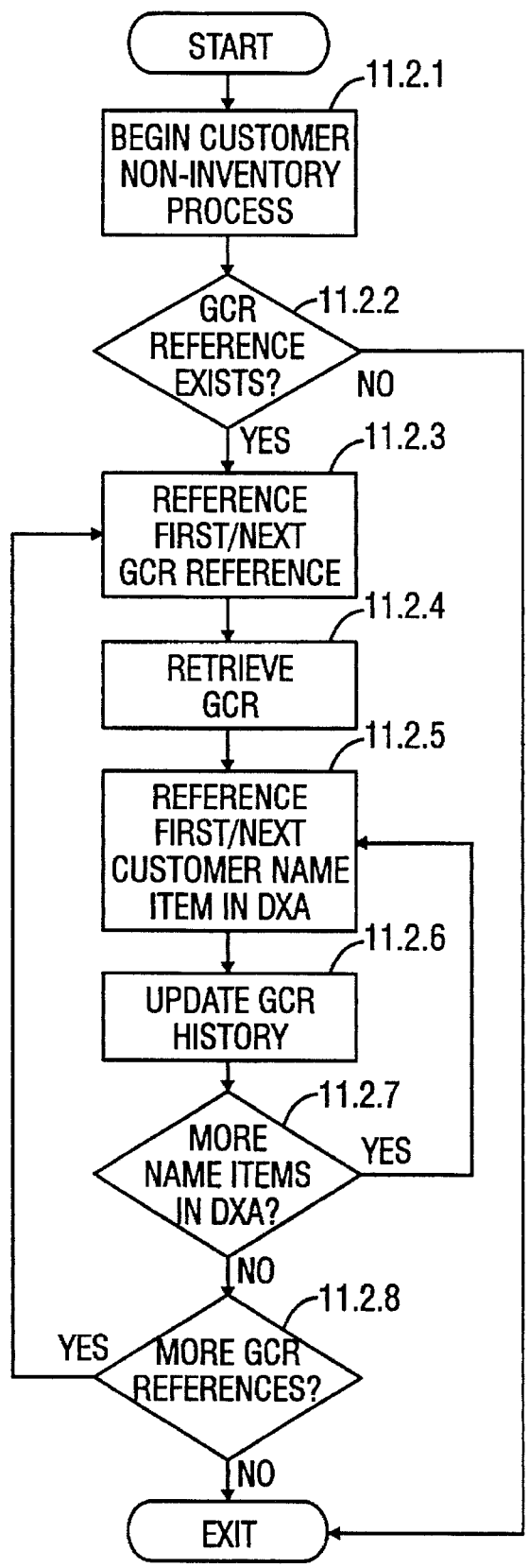
FIGS. 15a and 15b are flowcharts depicting in greater detail the save PNR step of FIG. 14.

Save the PNR step 11.2 of FIG. 14 is set out in greater detail in FIG. 15a for non-inventory items, and in FIGS. 15b–e for inventory items. Referring to FIG. 15a, in step 11.2.1, normal PNR processing of non-inventory items is done in a sequential manner. In step 11.2.2, the AAA is queried for the existence of a GCR reference. If a GCR reference does not exist, PNR processing continues as normal without accommodating group information. If a reference to a GCR does exist, the first of possible multiple GCR references is accessed in step 11.2.3. This reference is used to retrieve the appropriate GCR in step 11.2.4. PNR customer name changes reside in the DXA record. These items are processed individually in step 11.2.5. The customer name and inventory information are placed into the GCR history record in step 11.2.6. This process continues until all of the name items have been exhausted as determined by step 11.2.7. In step 11.2.8, it is determined whether any additional GCR references exist. If so, control passes back to step 11.2.3.

Figure 15B:
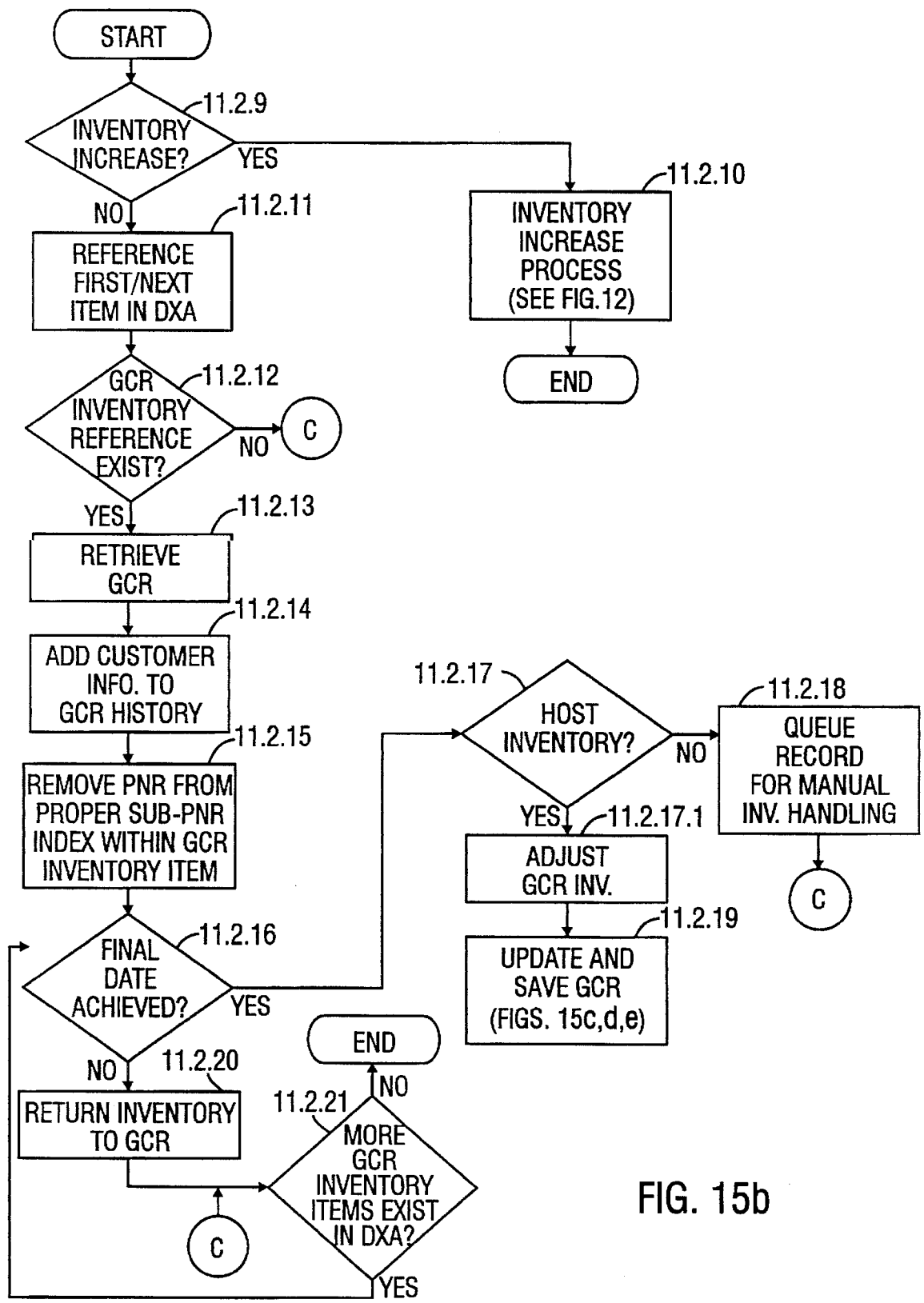

Normal PNR processing of inventory items may follow either an increase or decrease path as shown in FIG. 15b. Referring to FIG. 15b, in step 11.2.9, it is determined whether a customer inventory increase or decrease activity is required. If an increase is required, control is transferred to step 11.2.10 wherein the customer inventory increase process is performed, with steps identical to those of the create PNR step, shown in detail in FIG. 12.

The customer inventory decrease process begins by accessing multiple inventory items in the DXA record in step 11.2.11. The DXA inventory item is queried for more inventory items in step 11.2.12. If the GCR reference does exist, it is used to retrieve the appropriate GCR in step 11.2.13. The customer name and inventory information are placed into the GCR history record in step 11.2.14. The specific GCR inventory item is made available for update, and the PNR reference is removed from the Sub-PNR index within the GCR inventory item in step 11.2.15. In step 11.2.16, the GCR inventory item is checked to determine if a final date (FINAL) exists and whether it has been achieved. If the final date is not achieved, step 11.2.20 returns the inventory to the appropriate GCR inventory item instead of returning it to master inventory. If the final date has been achieved, the GCR inventory item is checked in step 11.2.17 to determine if it was obtained from a host provider. If the inventory item was not obtained from a host, step 11.2.18 places the GCR in the proper queue prompt index record. If obtained from a host, step 11.2.17.1 reduces the GCR inventory by the amount returned to master inventory.

Figure 15C:
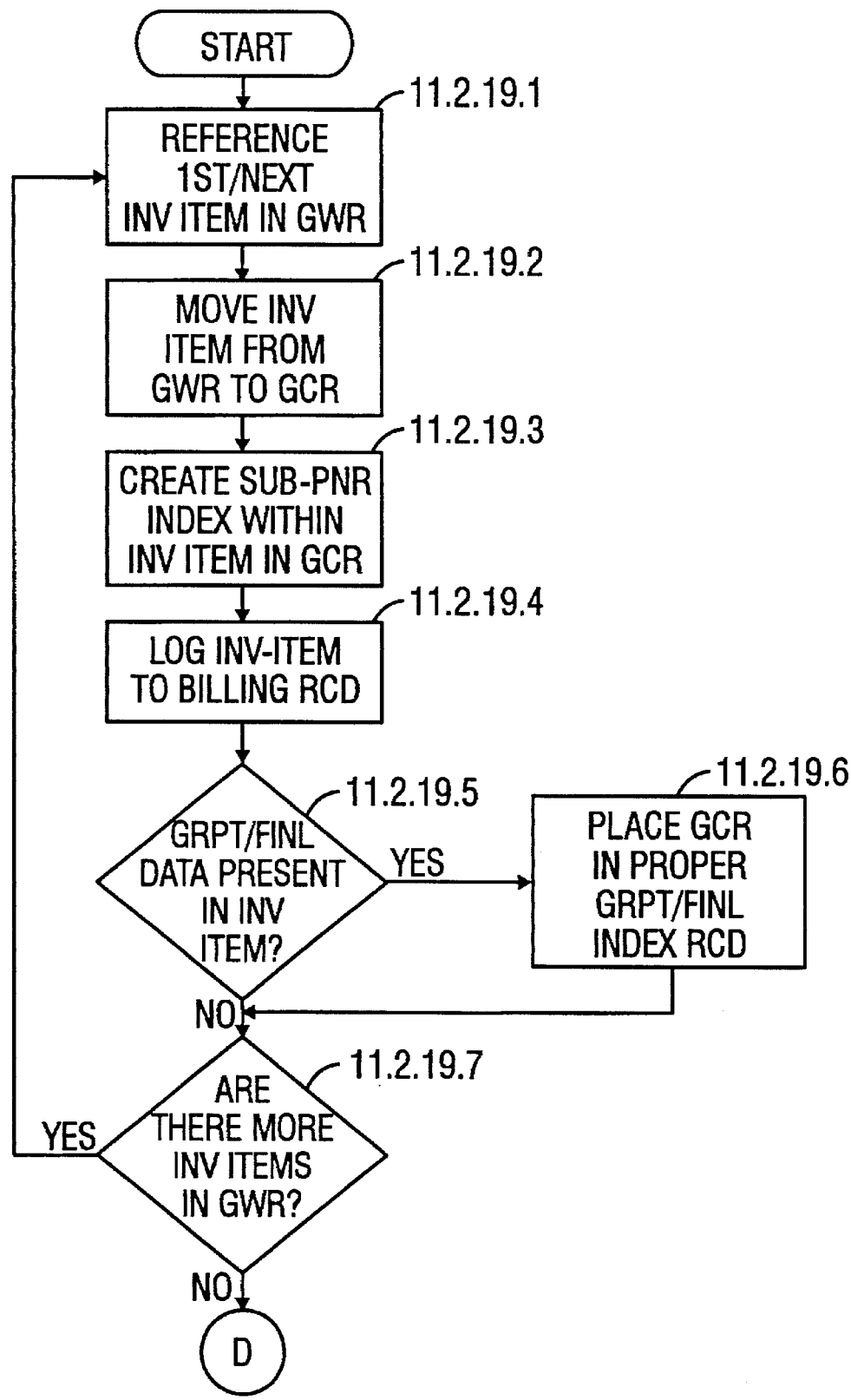
FIGS. 15c, 15d and 15e are flowcharts depicting in greater detail the update and save GCR step of FIG. 15b.
Figure 15D:
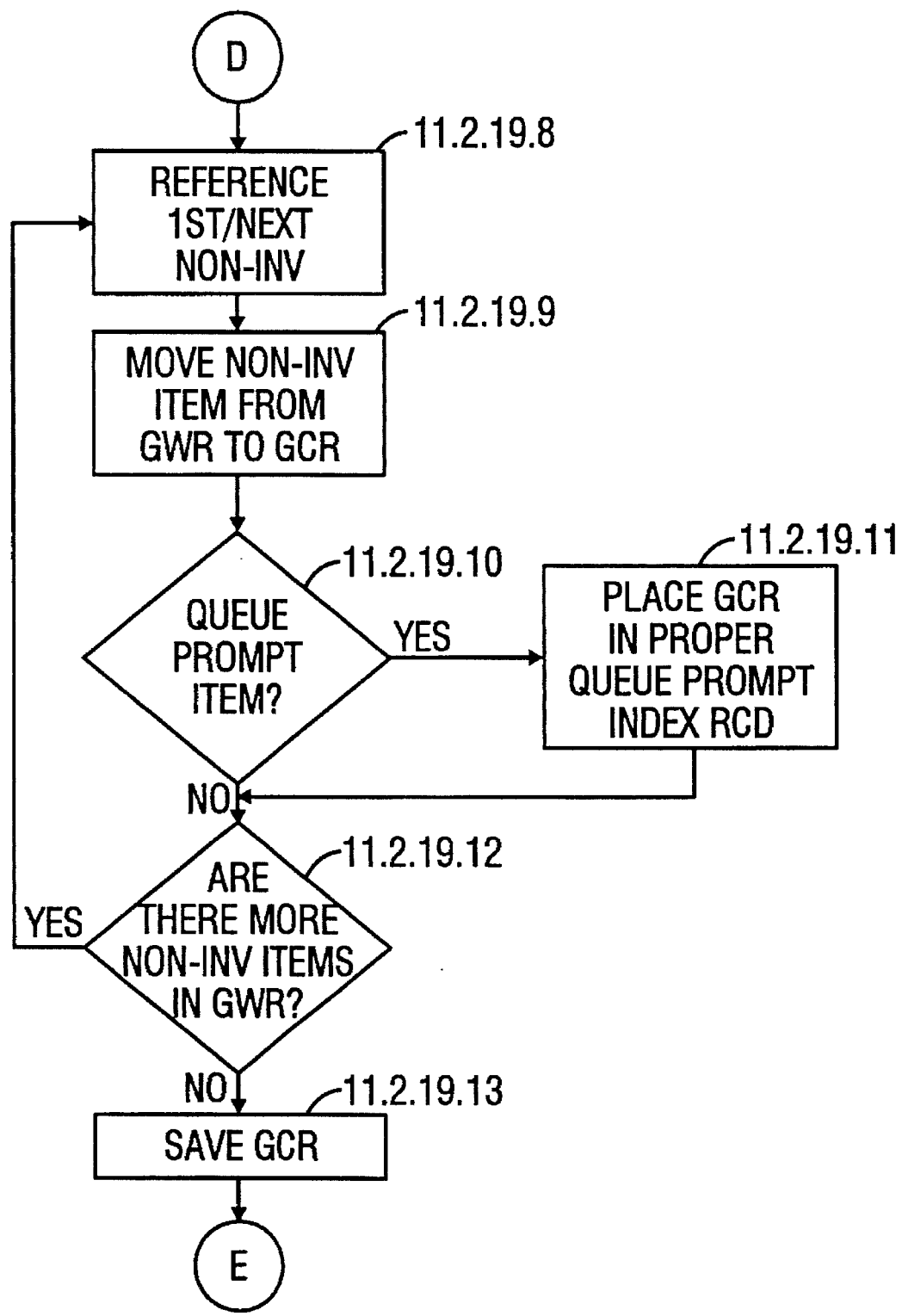
Figure 15E:
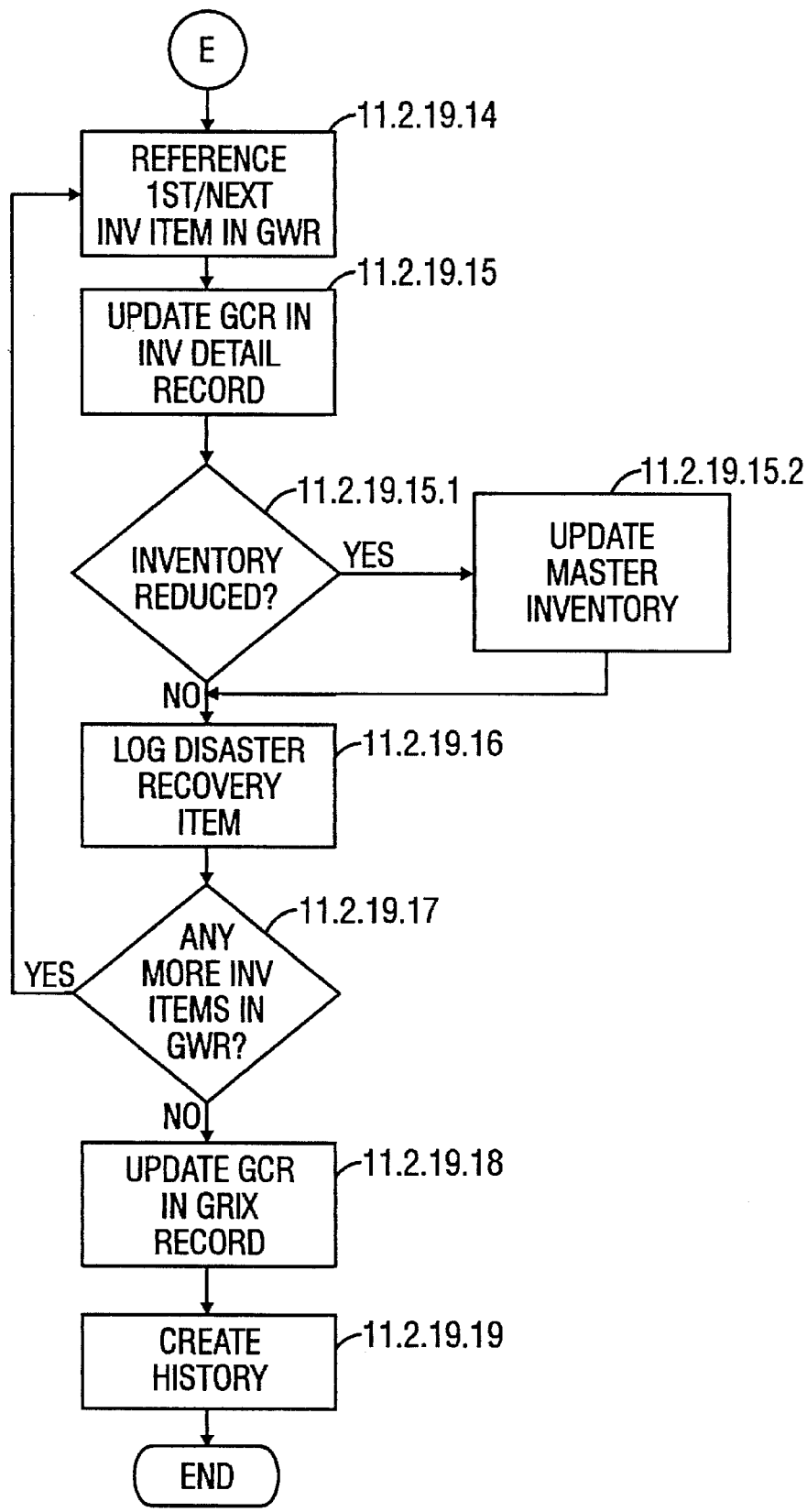

The update and save the GCR step 11.2.19, which closely parallels the process in steps 4.3 and 12.2, is set out in greater detail in FIGS. 15c, 15d and 15e. Referring to FIG. 15c, in steps 11.2.19.1 and 11.2.19.2, transfer of the information in the GWR to the GCR is done in a sequential manner, beginning with the first inventory item. As each inventory item is moved to the GCR, the Sub-PNR index is created for new inventory items and stored within the inventory item in step 11.2.19.3. Inventory item changes are also logged to the billing record in step 11.2.19.4. As a changed inventory item is transferred to the GCR it is queried for the existence of group tracking/final date(s) (GRPT/FINAL) within the individual inventory item. If group tracking/final date(s) is/are present as determined by step 11.2.19.5, then the GCR is placed in the proper GRPT/FINAL index record in step 11.2.19.6. If more inventory items exist within the GWR as determined by step 11.2.19.7, control passes back to step 11.2.19.1 where the process begins again.

Completion of the transfer of inventory items from the GWR to the GCR will start the transference of non-inventory items from the GWR to GCR set out in greater detail in FIG. 15d. In steps 11.2.19.8 and 11.2.19.9, each non-inventory item is transferred in a sequential manner. When new queue prompt items are encountered, as determined by step 11.2.19.10, the GCR is placed in the proper queue prompt index record in step 11.2.19.11. If more non-inventory items exist within the GWR as determined by step 11.2.19.12, control passes back to step 11.2.19.8, and the process is repeated. The GCR is filed to complete its creation in step 11.2.19.13. Referring to FIG. 15e, in step 11.2.19.14, inventory items in the GWR are once again queried for data required to create or locate the proper inventory detail index record. For GCRs that have had a name change or updated inventory, the GCR reference is updated in the inventory detail index record in step 11.2.19.15. In step 11.2.19.15.1, if the GCR inventory was reduced, master inventory is updated in step 11.2.19.15.2. Minimal required GCR data is written to a logging file, per updated inventory item (step 11.2.19.16). If more inventory items exist within the GWR as determined by step 11.2.19.17, control returns to step 11.2.19.14, where the process is repeated. City information in the GWR is used to create or locate the proper GRIX record in step 11.2.19.18. Records containing history of the GCR activity are created and/or maintained by way of reference in the GCR in step 11.2.19.19.

In step 11.2.20 of FIG. 15b, if the final date is not achieved, the inventory is returned to the appropriate GCR inventory item instead of returning it to master inventory. The DXA is then queried for more inventory items in step 11.2.21. If more DXA items exist as determined by step 11.2.21, control returns to step 11.2.11 and the process is repeated. Completion of the DXA search ends the process shown in FIG. 15b.

Figure 16:
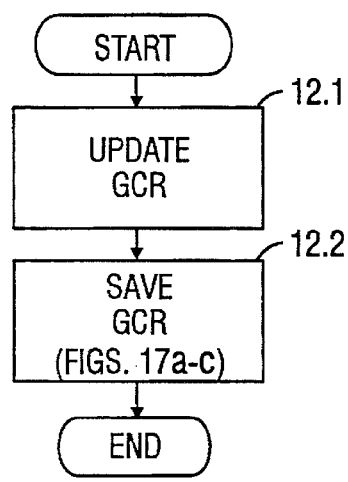
FIG. 16 is a flowchart depicting in greater detail the group inventory/non-inventory changes step of FIG. 3c.

The group inventory/non-inventory changes, step 12 of FIG. 3c, are set out in greater detail in FIG. 16. These changes include any of the actions listed above in the definition of the GCR. Referring to FIG. 16, in step 12.1, the GCR is retrieved through Agent group activity. The Agent supplies an entry to complete a GCR transaction in step 12.2.

Figure 17A:
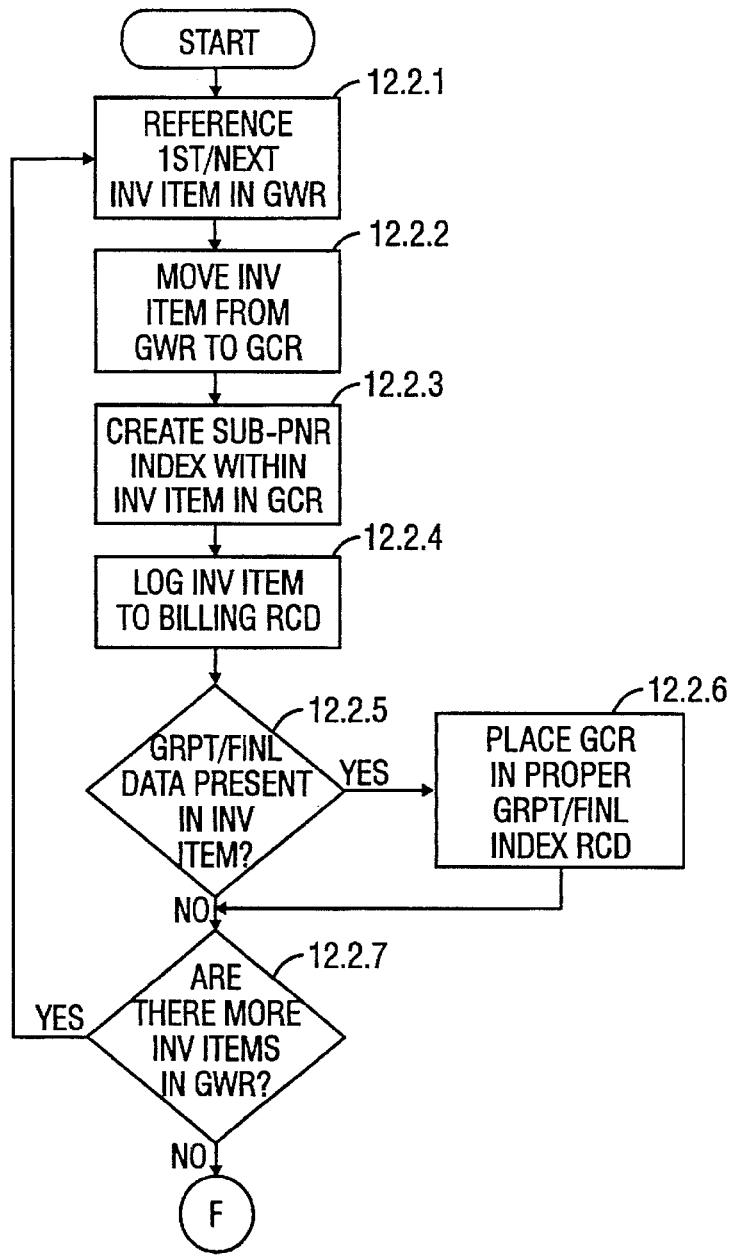
FIGS. 17a, 17b and 17c are flowcharts depicting in greater detail the save GCR step of FIG. 16.
Figure 17B:
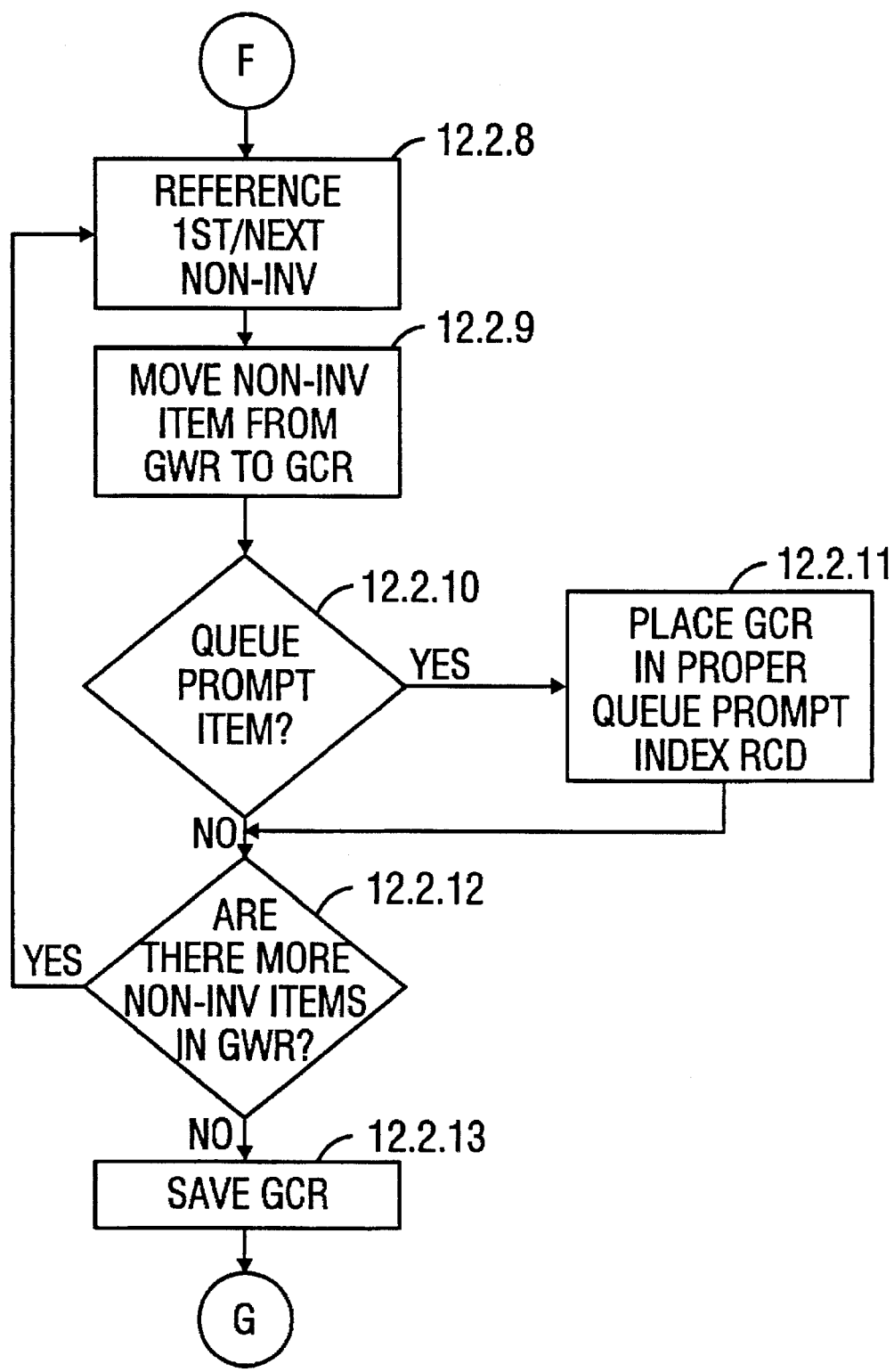
Figure 17C:
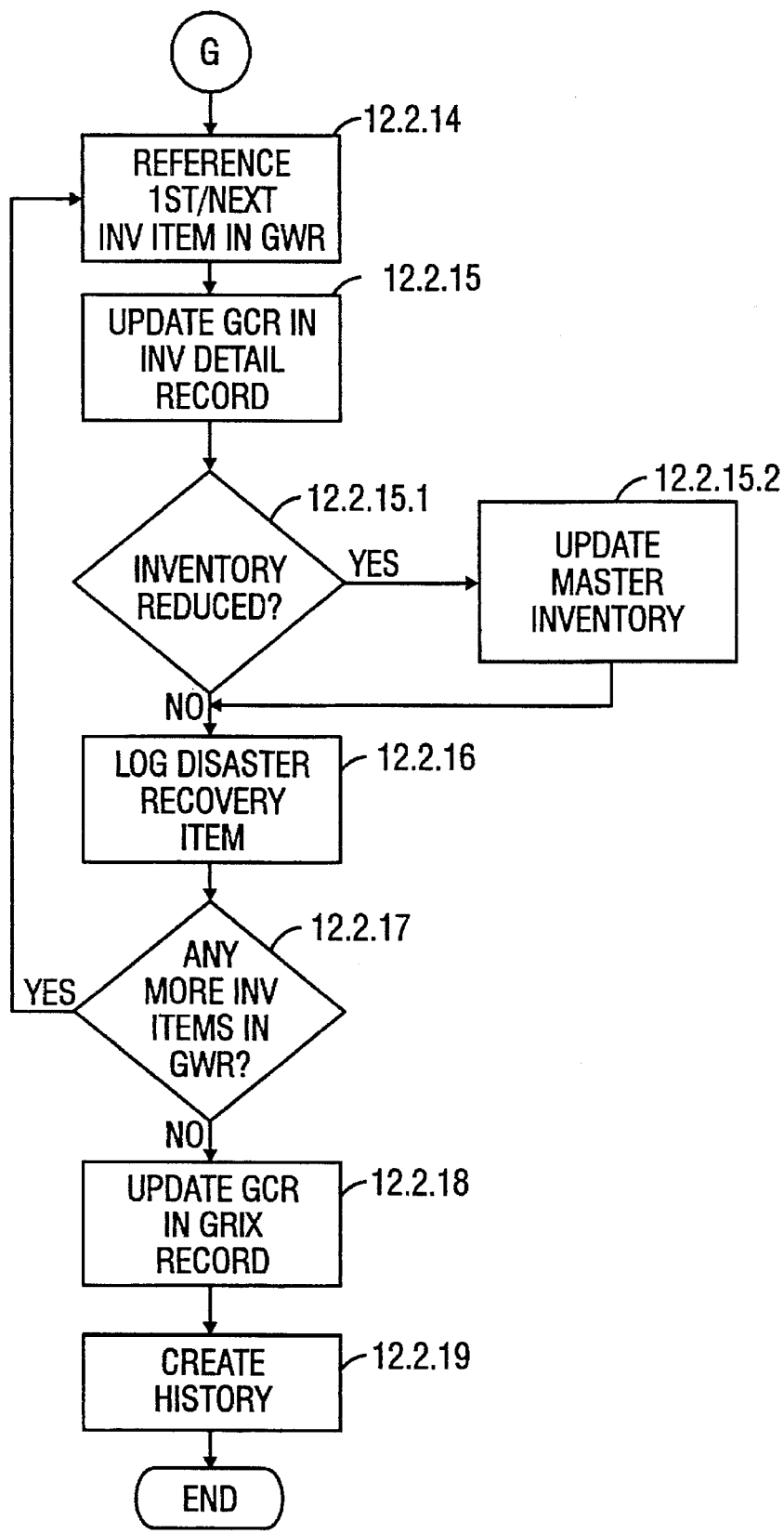

The save the GCR (step 12.2 of FIG. 16) is set out in greater detail in FIGS. 17a–17c. This process is similar to that detailed in FIG. 7 (step 4.3) and FIG. 15b (step 11.2.19). Referring to FIG. 17a, in steps 12.2.1 and 12.2.2, transfer of the information in the GWR to the GCR is done in a sequential manner, beginning with the first inventory item. As each inventory item is moved to the GCR, the Sub-PNR index is created for new inventory items and stored within the inventory item in step 12.2.3. Inventory item changes are also logged to the billing record in step 12.2.4. As a changed inventory item is transferred to the GCR it is queried in step 12.2.5 for the existence of group tracking/final date(s) within the individual inventory item. If group tracking/final date(s) is/are present then the GCR is placed in the proper GRPT/FINAL index record in step 12.2.6. If more inventory items exist within the GWR as determined by step 12.2.7, control passes back to step 12.2.1 and the process is repeated.

Completion of the transference of inventory items from the GWR to the GCR will start the transference of non-inventory items from the GWR to GCR shown in detail in FIG. 17b. Referring to FIG. 17b, in steps 12.2.8 and 12.2.9, each non-inventory item is transferred in a sequential manner. When new queue prompt items are encountered in step 12.2.10 the GCR is placed in the proper queue prompt index record in step 12.2.11. If more non-inventory items exist within the GWR as determined by step 12.2.12, control passes back to step 12.2.8 and the process is repeated. The GCR is filed to complete its creation in step 12.2.13.

Referring now to FIG. 17c, in step 12.2.14, inventory items in the GWR are once again queried for data required to create or locate the proper GRID record. For GCRs that have had a name change or updated inventory, the GCR reference is updated in the GRID record in step 12.2.15. In step 12.2.15.1, if the GCR inventory was reduced, master inventory is updated in step 12.2.15.2. Minimal required GCR data is written to a logging file, per updated inventory item in step 12.2.16. If more inventory items exist within the GWR as determined by step 12.2.17, control passes back to step 12.2.14 and the process is repeated. City information in the GWR is used to create or locate the proper GRIX record. For GCRs that have had a name change or updated inventory, the GCR reference is updated in the GRIX record in step 12.2.18. Records containing history of the GCR activity are created and/or maintained by way of reference in the GCR in step 12.2.19.

Figure 18:
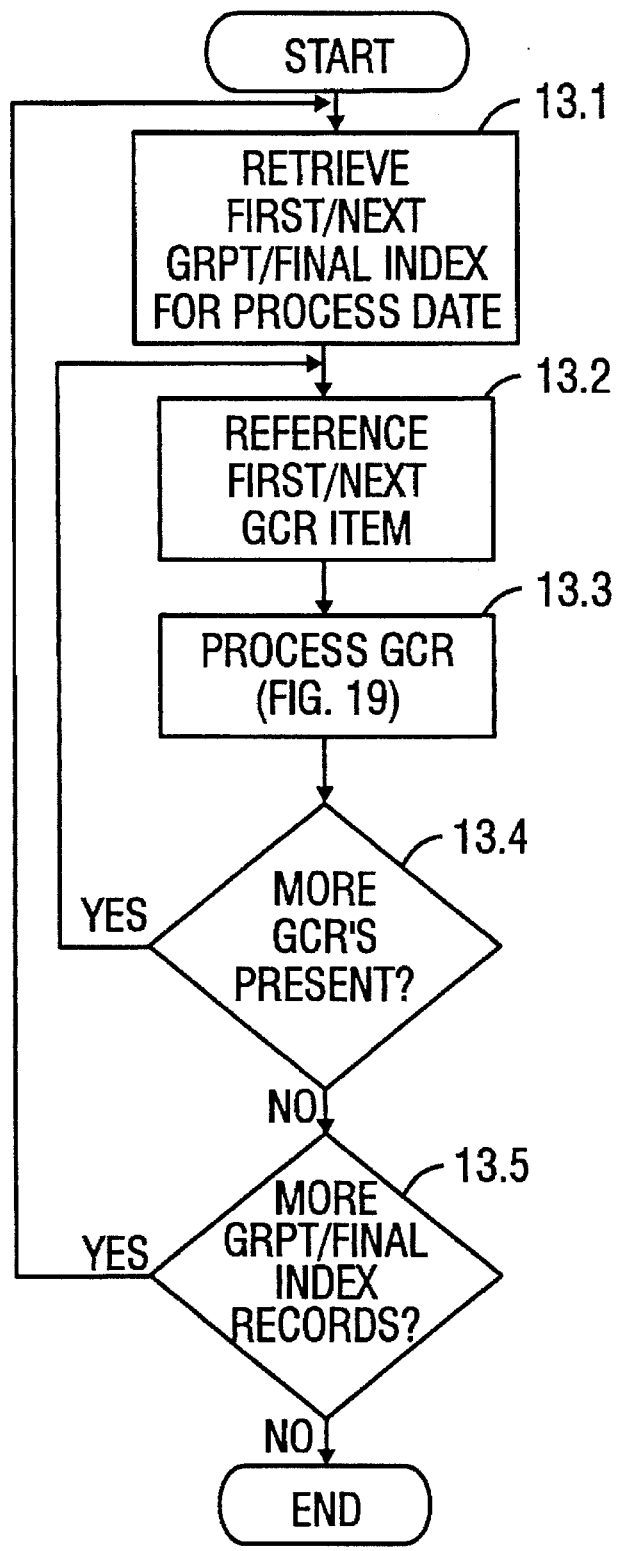
FIG. 18 is a flowchart depicting in greater detail the group tracking step of FIG. 3c.

Group tracking (step 13 of FIG. 3c) is set out in greater detail in FIG. 18. Group tracking is a utility which is activated either via a time initiated function table or an Agent entry, and functions to capture group inventory utilization counts and to process final dates for return of master inventory. Referring to FIG. 18, in step 13.1, the GRPT/FINAL index record is retrieved for the utility activation date. The index record is searched sequentially for GCR references in step 13.2. Each GCR is retrieved and processed in step 13.3.

Figure 19:
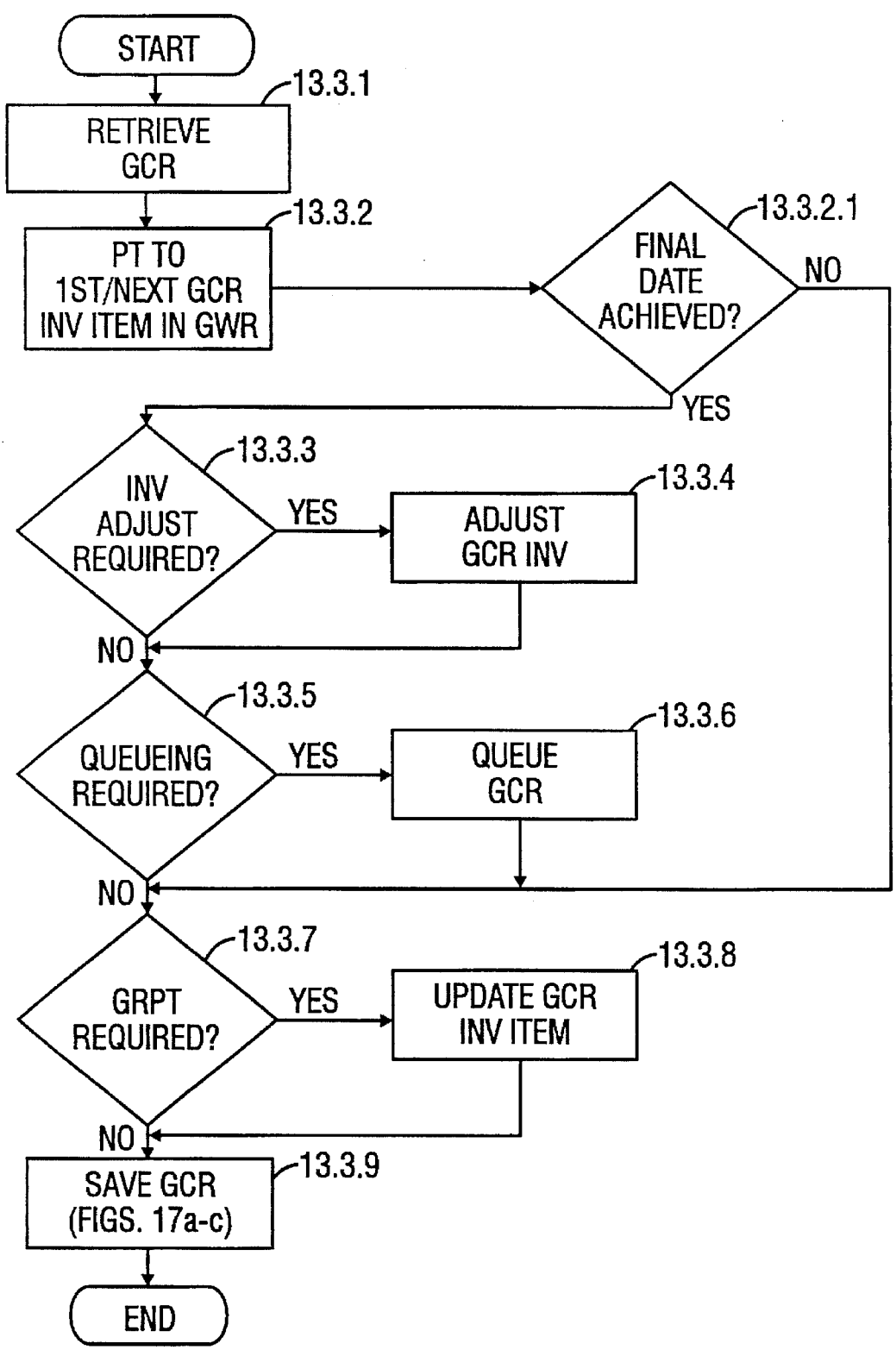
FIG. 19 is a flowchart depicting in greater detail the process GCR step of FIG. 18.

Process GCR (step 13.3) is set out in greater detail in FIG. 19. Referring to FIG. 19, in step 13.3.1 the GRPT/FINAL GCR reference is used to locate and retrieve the GCR into a GWR. The GCR inventory items are searched for and referenced in step 13.3.2. In order to properly adjust inventory, the GCR inventory item is checked in step 13.3.2.1 to determine if a final date exists and whether it has been achieved. If the final date is not achieved, no inventory action is taken and control passes to step 13.3.7. If the final date has been achieved, the GCR inventory item is checked in step 13.3.3 to determine if it was obtained from a host provider. If obtained from a host, the inventory item is reduced by the amount of unused inventory to be returned to master inventory (step 13.3.4). If the inventory item was not obtained from a host, the GCR is placed in the proper queue prompt index record in steps 13.3.5 and 13.3.6. The GCR inventory item is also checked in step 13.3.7 to determine if a GRPT date exists and has been achieved. If the date has been achieved, the current inventory level counts are captured to the GCR inventory item in step 13.3.8. The GCR is then updated and filed in step 13.3.9. This process is set out in more detail in FIGS. 17a–c. Returning to FIG. 18, in step 13.4, if more GCR items exist within the GRPT/FINAL index record, the process is repeated beginning at step 13.2. Once all GCR items are exhausted for a record and another index record exists as determined by step 13.5, control passes back to step 13.1 and the next GRPT/FINAL index record is retrieved.

Figure 20:
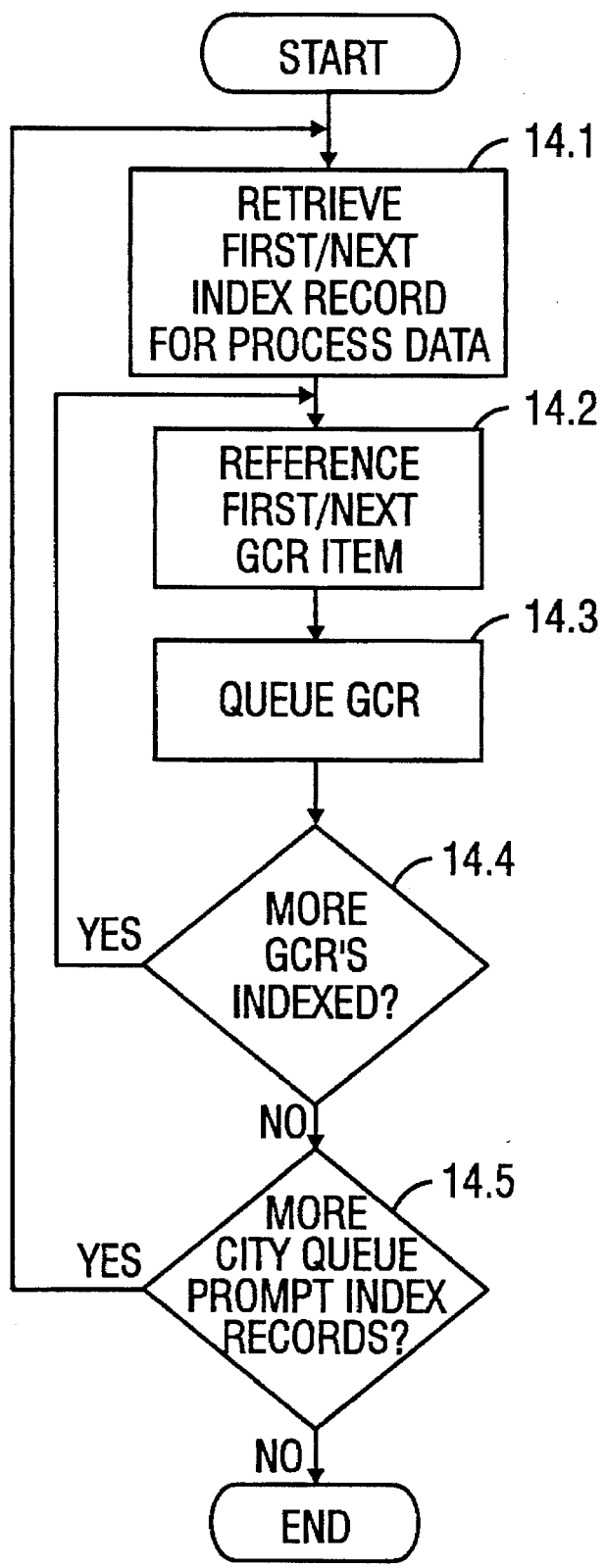
FIG. 20 is a flowchart depicting in greater detail the record queuing step of FIG. 3c.

Record queuing (step 14 of FIG. 3c) is set out in greater detail in FIG. 20. Record queuing is a utility which is activated either via a time initiated function table or an Agent entry, and functions to queue GCRs based on the queue prompt index record that is created from the date in the QMDR field. Referring to FIG. 20, in step 14.1, the city queue prompt index record is retrieved for the utility activation date. The index record is searched sequentially for GCR references in step 14.2, and each GCR reference is placed into a queue record in step 14.3. If more GCR items exist within the queue prompt index record as determined by step 14.4, the process is repeated at step 14.2. Once all GCR items are exhausted for a record and another index record exists, determined by step 14.5, the next queue prompt index record is retrieved in step 14.1 and the process is repeated.

Figure 21A:
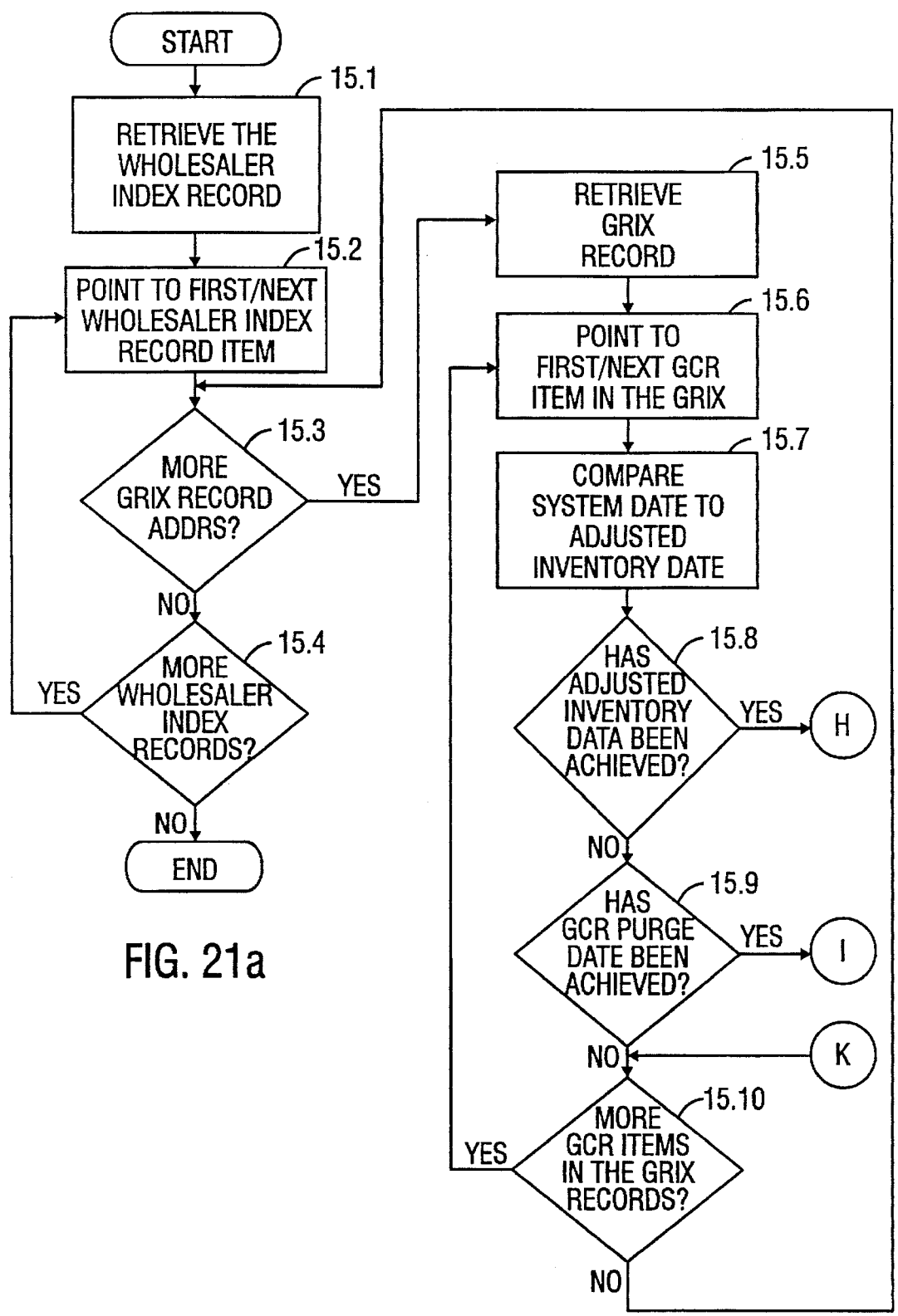
FIGS. 21a, 21b and 21c are flowcharts depicting in greater detail the record maintenance step of FIG. 3c.
Figures 21B, 21C:
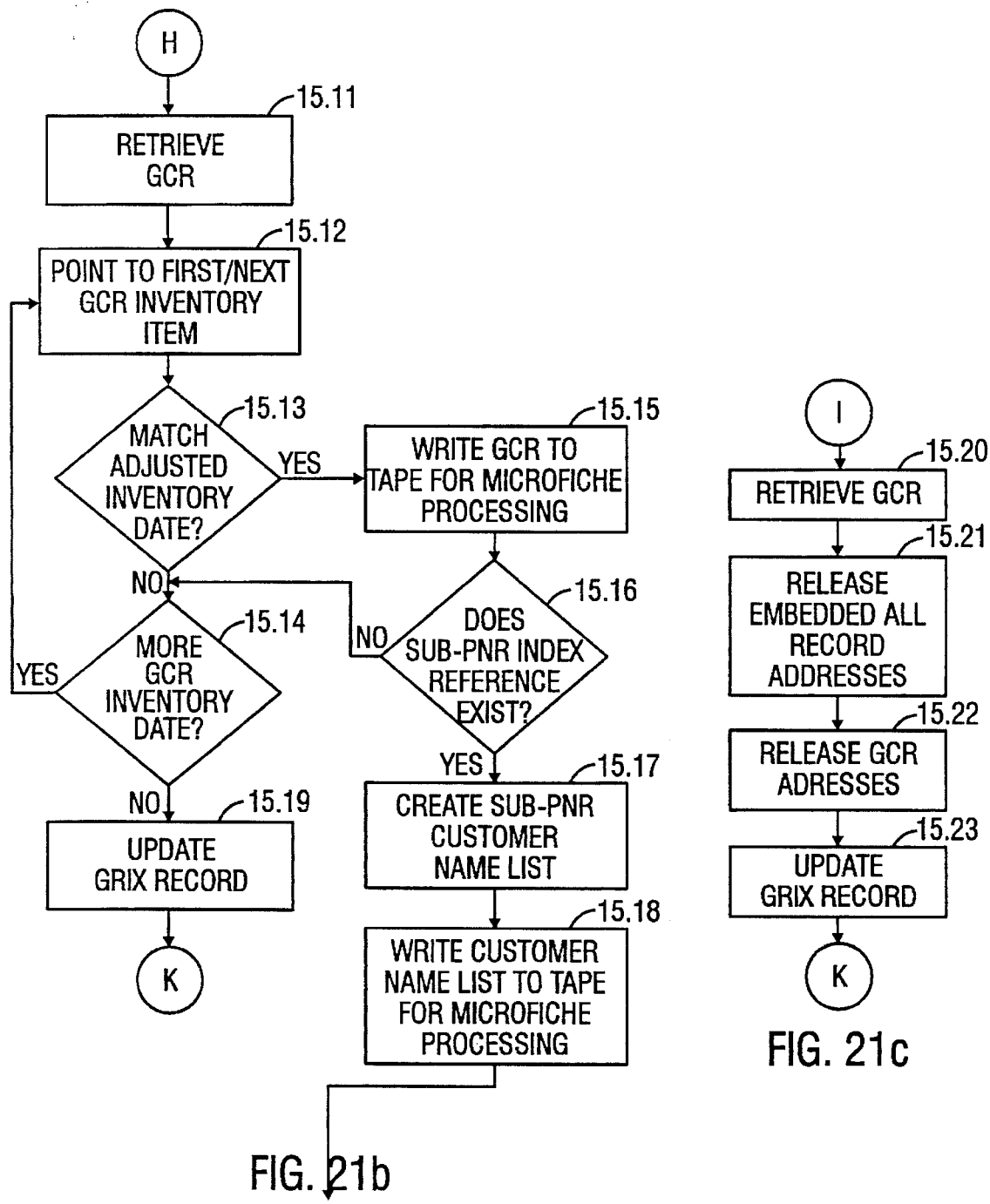

Record maintenance, also known in the industry as nightly file maintenance, (step 15 of FIG. 3c) is set out in greater detail in FIGS. 21a–c. Record maintenance is a utility which is activated via an Agent entry, and functions to purge past-date GCRs, return their records to the system and write a copy of the purged GCR to tape.

Referring to FIGS. 21a–c, in step 15.1, initially the Wholesaler Index Record (WIT) is retrieved and the first WIT item is addressed in step 15.2. The WIT item is interrogated to determine if any GRIX record address items exist in step 15.3. If all GRIX record address items are exhausted and all WIT records have been processed as determined by step 15.4, the utility completes. If all WIT records have not been retrieved, the next WIT is retrieved and the first item referenced in step 15.2.

If a GRIX record address item exists as determined by step 15.3, the GRIX is retrieved in step 15.5 and the first GCR item in the record is addressed in step 15.6. The current system date may then be compared to both the adjusted inventory date and the purge date in the GCR item in step 15.7. The adjusted inventory date is the first date of departure for any inventory item held in the GCR, and the purge date is the last date of departure, plus a predetermined number of days (for example, seven), for any inventory item held in the GCR. If neither the adjusted inventory date nor the purge date have been achieved, as determined by steps 15.8 and 15.9, the GRIX is checked for more GCR items in step 15.10. If no more items exist, steps 15.3 and 15.4 are repeated to ensure all WIT records are processed. If the purge date has been achieved as determined by step 15.9, the GCR is retrieved in step 15.20 and all records referenced in the GCR are returned to the system in step 15.21. The GCR record is returned in step 15.22 and its reference removed from the GRIX record in step 15.23.

Processing continues at step 15.10 to determine if more GCR items for this owner specific index remain to be processed. If the adjusted inventory date has been achieved as determined by step 15.8, the GCR is retrieved in step 15.11 and the first GCR inventory item is addressed in step 15.12. This item is then tested for a match on the adjusted inventory date in step 15.13. If there is a match on the adjusted inventory date, the GCR is written to tape for microfiche processing in step 15.15. If Sub-PNR references exist for the GCR inventory item as determined by step 15.16, a Sub-PNR name list is produced in step 15.17 and it is also written to tape for microfiche processing in 15.18. At this point a check is made in step 15.14 to determine if more GCR inventory items exist for this GCR. Processing loops through steps 15.12–15.18, until all GCR inventory items are exhausted for this GCR. Once all of the GCR inventory items have been reviewed, the GCR item in the GRIX record is updated in step 15.19 to reflect the new adjusted inventory date. Processing continues at step 15.10 until all GCR items have been processed, the WIT record is queried for more GRIX record address items and wholesaler index items in steps 15.3 and 15.4 until all WIT records have been processed and the utility completes.

In summary then, according to the present invention, a computer reservation system for travel related services with automatic handling of group travel is presented. In addition to a master inventory of travel related services, and a plurality of passenger name records which include the relationship between a particular customer and particular reserved travel related services, the present invention uses a Group Control Record to keep track of a particular group of travel related services being offered. The Group Control Record maintains a group inventory of travel related services being offered in that particular group, as well as a set of group related Passenger Name Records (Sub-PNRs) of customers that have reserved items of group inventory. The group inventory is cross referenced to the master inventory, and the Sub-PNRs are cross referenced to the group. In operation, according to the present invention, when changes are made to any of the master inventory, GCRs or PNRs, appropriate changes are automatically made in the others of these items. For example, if a change is made to master inventory, a change, if appropriate, is made to the group inventory in the GCR, and changes, if appropriate, are made to the Sub-PNRs referenced by the GCR. Similarly, changes made to any GCR will result in automatic appropriate changes being made in master inventory and in the PNRs. Likewise, changes made to the PNRs will result in appropriate changes to the GCRs and master inventory.

The present invention has the flexibility to accommodate and track movement of large parties in several different activities other than air travel. These include such things as bus, rail, tours, cruises, meetings, parties and conventions, for example.

For each of these items, according to an actual embodiment of the present invention, a wholesaler could use a GCR to book or track up to 99 items, with each item accommodating up to 999 people. This would allow movement of up to 98,901 people through a single GCR. Each item could reflect a different provider of some type of service, a different level of service or each item could be more specialized to reflect different preferences requested by clients.

C. EXAMPLE

To illustrate some of the features of the present invention, a specific example is provided.

On Jan. 1, 1990, authorized wholesaler A23, arranges a cruise for a group of 200 passengers on the 'Princess' cruise line. The cruise departs Ft. Lauderdale on Feb. 17, 1990 and returns Feb. 28, 1990. Agencies for the wholesaler expect 100 passengers from each of two cites, Denver and Chicago, to arrive in and depart from Ft. Lauderdale via 2 air carriers, United and American. United is the host provider for this example. The passengers will have the choice of two classes of services on each airline. Based on this information, an agent for the wholesaler, with initials SWS, builds a GCR containing the following information.

| Action | Field | Description |
|---|---|---|
| GID | Ownership of GCR | Wholesaler ID of the GCR owner |
|  | Content of this field: A23 |  |
| N: | Group Name | Title of the GCR |
|  | Contents of this field: Princess |  |
| R: | Received | The GCR builder |
|  | Contents of this field: SWS |  |
| P: | Phone Field | Free form after city |
|  | Contents of this field: DENB/303 123 4567 |  |
| O | Inventory information | Host and other inventory |
|  | Contents of this field: |  |
|  | Segment 1 |  |
|  | United flight 1, 50 seats, class Y, departs Feb. 17, from Denver to Ft. Lauderdale. |  |
|  | Segment 2 |  |
|  | United flight 1, 50 seats, class F, departs Feb. 17, from Denver to Ft. Lauderdale. |  |
|  | Segment 3 |  |
|  | American flight 2, 70 seats, class Y, departs Feb. 17, from Chicago to Ft. Lauderdale. |  |
|  | Segment 4 |  |
|  | American flight 2, 30 seats, class F, departs Feb. 17, from Chicago to Ft. Lauderdale. |  |
|  | Segment 5 |  |
|  | United flight 3, 50 seats, class Y, departs Feb. 28, from Ft. Lauderdale to Denver. |  |
|  | Segment 6 |  |
|  | United flight 3, 50 seats, class F, departs Feb. 28, from Ft. Lauderdale to Denver. |  |
|  | Segment 7 |  |
|  | American flight 4, 50 seats, class Y departs Feb. 28, from Ft. Lauderdale to Chicago. |  |
|  | Segment 8 |  |
|  | American flight 4, 50 seats, class F, departs Feb. 28, from Ft, Lauderdale to Chicago. |  |
| FINAL | Inventory Final Return Date | Date in the inventory item on which unused inventory must be returned to provider. |
|  | Contents of this field: |  |
|  | For segments 1–4, the FINAL date is Feb. 1 |  |
|  | For segments 5–8, the FINAL date is Feb. 8 |  |
| GRPT | Inventory Group Tracking (Penalty) Date(s) | Date(s) contained in the |

| Action | Field | Description |
|---|---|---|
| | | inventory item on which a capture of current inventory levels is desired |
| | Contents of this field: For Segments 1–4, the GRPT dates are Jan. 15, Jan. 30 For Segments 5–8, the GRPT dates are Jan. 15, Jan. 30, Feb. 7 | |
| OMDR | Queue Minder | A date on which the GCR is to be queued to specific queue. |
| | Contents of this field; Jan. 30, queue number 15 | |

When the GCR is completed, the PNID for each United segment will contain a reference to the GRID. The GRID will contain a reference to the GCR for each United segment. The GRIX will contain a single reference to the GCR. The WIT will contain a single reference to the GRIX.

The following display is an example of how the GCR would display with the above data:

```
G3431M6/BB DENOU ZA23BB AG 5JAN
A23 - CRUISE TOURS
PRINCESS
1 UA IY  17FEB DENFLL HK  945P  405A TH FINAL-DEN1FEB
    AVL- 50  BKD- 0  CUR- 50    ORG- 50  HI- 50
    GRPT-CUR   33-15JAN/      18-30JAN/
    SEA-BKD    33-15JAN/      18-30JAN/
2 UA 1F  17FEB DENFLL HK  945P  405A TH FINAL-DEN1FEB
    AVL- 50  BKD- 0  CUR- 50    ORG- 50  HI- 50
    GRPT-CUR   33-15JAN/      18-30JAN/
    SEA-BKD    33-15JAN       18-30JAN/
3 AA 2Y  17FEB ORDFLL GK  945P  405A TH FINAL-DEN1FEB
    AVL- 70  BKD- 0  CUR- 70    ORG- 70  HI- 70
    GRPT-CUR   33-15JAN/      18-30JAN/
    SEA-BKD    33-15JAN/      18-30JAN/
4 AA 2F  17FEB ORDFLL HK  945P  405A TH FINAL-DEN1FEB
    AVL- 30  BKD- 0  CUR- 30    ORG- 30  HI- 30
    GRPT-CUR   33-15JAN/      18-30JAN/
    SEA-BKD    33-15JAN/      18-30JAN/
5 UA 3Y  28FEB FLLDEN HK  945P  405A TH FINAL-DEN8FEB
    AVL-50  BKD- 0  CUR- 50    ORG- 50  HI- 50
    GRPT-CUR   44-15JAN/      29-30JAN/    21-7FEB/ 1-27FEB/
    SEA-BKD    44-15JAN/      29-30JAN/    21-7FEB/ 1-27FEB/
6 UA 3F  28FEB FLLDEN  GK    945P  405ATHFINAL-DEN8FEB
    AVL- 50  BKD- 0  CUR- 50    ORG- 50  HI- 50
    GRPT-CUR   44-15JAN/      29-30JAN/    21-7FEB/
    SEA-BKD    44-15JAN/      29-30JAN/    21-7FEB/
7 AA 4Y  28FEB FLLORD    GK    945P 405ATHFINAL-DEN8FEB
    AVL- 50  BKD- 0  CUR- 50    ORG- 50  HI- 50
    GRPT-CUR   44-15JAN/      29-30JAN/    21-7FEB/
    SEA-BKD    44-15JAN/      29-30JAN/    21-7FEB/
8 AA 4F  28FEB FLLORD  GK    945P 405ATHFINAL-DEN8FEB
    AVL- 50 BKD- 0  CUR- 50    ORG- 50  HI- 50
    GRPT-CUR   44-15FEB/      29-30JAN/    21-7FEB/
    SEA-BKD    44-15JAN/      29-30JAN/    21-7FEB/
FONE-DENB/303 123 1234
QMDR-G30JAN/A23/15/1ST REVIEW
```

As individual passengers begin to book their air space for the cruise, the GCR and associated Sub-PNRs are updated. For example, Passengers A and B book 2 seats in F class round-trip on the United flights from Denver. The following will occur when the Sub-PNR is built by an Agent:

1. The Sub-PNR will contain both United segments from the GCR with two seats in each segment. Each segment in the PNR will contain a reference to the GCR.

2. The GCR's United segments' available (AVL) counts will be decremented by two seats. The booked (BKD) counts will be incremented by two seats.

3. The Sub-PNR index for each GCR segment will be updated to contain a reference to the Sub-PNR for Passengers A and B.

When the PNR is complete, the itinerary will display as in the following example:

```
2PASSENGER/A/B
1 UA 1F     17FEB DENFLL   HK2 945A   405P TH   G3431M6
2 UA 3F     28FEB FLLDEN   HK2 945A   405P TH   G3431M6
```

The resulting GCR segments will display as in the following example:

```
2 UA 1F  17FEB DENFLL HK   945P  405A TH   FINAL-DEN1FEB
    AVL- 48  BKD- 2  CUR- 50    ORG- 50  HI- 50
    GRPT-CUR   33-15JAN/      18-30JAN/
    SEA-BKD    33-15JAN/      18-30JAN/
6 UA 3F  28FEB FLLDEN HK   945P  405A TH   FINAL-DEN8FEB
    AVL- 48  BKD- 2  CUR- 50    ORG- 50  HI- 50
    GRPT-CUR   44-15JAN/      29-30JAN/    21-7FEB/
    SEA-BKD    44-15JAN/      29-30JAN/    21-7FEB/
```

In the event of a reservation cancellation by Passengers A and B, the Agent would retrieve and cancel the Sub-PNR segments. The following will occur when the Sub-PNR cancellation action is complete:

1. The Sub-PNR segments and their references to the GCR will be removed from the Sub-PNR.

2. The GCR's United segments' available (AVL) counts will be incremented by two seats. The booked (BKD) counts will be decremented by two seats.

3. The Sub-PNR index for each GCR segment will be updated to delete the reference to the Sub-PNR for Passengers A and B.

When the first GRPT date of Jan. 15 is achieved, the GCR inventory segments will be updated as follows, assuming 20 seats have been sold into Sub-PNRs for United segments 2 and 6:

```
2 UA 1F  17FEB DENFLL HK      945P 405A TH   FINAL-DEN1FEB
    AVL- 30  BKD- 20  CUR- 50  ORG- 50  HI- 50
    GRPT-CUR   33-15JAN/50    18-30JAN/
    SEA-BKD    33-15JAN/20    18-30JAN/
6 UA 3F  28FEB FLLDEN HK   945P 405A TH   FINAL-DEN8FEB
    AVL- 30  BKD- 20  CUR-50  ORG- 50  HI- 50
    GRPT-CUR   44-15JAN/50    29-30JAN/    21-7FEB/
    SEA-BKD    44-15JAN/20    29-30JAN/    21-7FEB/
```

All other inventory segments that have had no seats sold to Sub-PNRs or any other inventory activity, for example, Segment 7 will show as follows.

```
7 AA 4Y  28FEB FLLORD GK     945P 405A TH   FINAL-DEN8FEB
    AVL- 50  BKD- 0  CUR- 50  ORG- 50  HI- 50
    GRPT-CUR   44-15JAN/50    29-30JAN/    21-7FEB/
    SEA-BKD    44-15JAN/0     29-30JAN/    21-7FEB/
```

When the FINAL dates of both Feb. 1 and Feb. 8 are achieved, the GCR will be updated as follows, assuming 20 seats have been sold into Sub-PNRs for United segments 2 and 6:

1. The thirty unused seats at the time the FINAL date was achieved, are considered canceled and returned to master inventory.

2. The GRID items for each segment are updated with the new current blocked counts.

3. The GCR inventory segments' available counts are reduced to zero and the current blocked counts are reduced to twenty.

Segments 2 and 6 of the GCR will then display as in the following example:

```
2 UA 1F  17FEB DENFLL HK   945P  405A TH  FINAL*DEN1FEB
    AVL- 0  BKD- 20  CUR-20 ORG-50  HI- 50
GRPT-CUR    33-15JAN/50    18-30JAN/50
SEA-BKD     33-15JAN/20    18-30JAN/20
6 UA 3F  28FEB FLLDEN HK   945P  405A TH  FINAL*DEN8FEB
    AVL- 0  BKD- 20  CUR-20 ORG- 50  HI- 50
GRPT-CUR    44-15JAN/50    29-30JAN/50    21-7FEB/50
SEA-BKD     44-15JAN/20    29-30JAN/20    21-7FEB/20
```

If no seats are sold for a host-provider (UA) segment when the FINAL date is achieved, all current blocked seats are returned to inventory and the GCR inventory item is removed from the GCR. This will result in the cancellation of the GCR reference in the GRID and the GRIX records. For a non-host provider (AA), the inventory is not adjusted and a message is queued to prompt a manual return of the master inventory. For both providers, the inventory item is updated to indicate the final date was achieved.

If a status code change is done to a GCR inventory segment, the changes will be propagated to all Sub-PNRs contained in the Sub-PNR index record referenced by the GCR inventory segment. For example, if the status code HK in segment 2 of the GCR was changed to WK while the passengers' PNR still contained inventory sold from that GCR's segments, the following would occur when the GCR change was completed by the agent;

1. The Sub-PNR inventory items sold from the GCR inventory item would be updated with the new status code.

2. The GCR inventory item status code would be updated with the new status code.

The GCR inventory segment would then display as follows:

```
2 UA 1F  17FEB DENFLL WK   945P  405A TH  FINAL*DEN1FEB
    AVL- 0  BKD- 20  CUR- 20    ORG- 50  HI-50
GRPT-CUR    33-15JAN/50    18-30JAN/50
SEA-BKD     33-15JAN/20    18-30JAN/20
The Sub-PNR inventory segment would display as follows;
1 UA 1F  17FEB DENFLL WK2  945A 405P    TH   3431M6
```

Although the present invention has been described with respect to a single preferred embodiment, it will be understood that changes, additions and deletions can be made to the preferred embodiment without departing from the scope of the present invention.

We claim:

1. A computerized reservation system for managing group travel related services and for automatically updating modifications to group travel related data, comprising:

at least one remote storage unit storing:

a master inventory of travel related services, a plurality of passenger name records, and at least one group control record, each group control record being indicative of a particular group inventory of travel related services and group related passenger name records that are a subset of said plurality of passenger name records for customers that reserve said travel related services from said particular group inventory, wherein said subset of group related passenger name records, said master inventory of travel related services and said at least one group control record contain cross referencing data to each other, a remote computer system coupled to said at least one storage unit for automatically updating group travel related data in said master inventory, said at least one subset of group related passenger name records, and said at least one group control record responsive to modifications to group travel related data in at least one of the three; and a plurality of local computer systems in electronic communication with said remote computer system for making group reservations and modifying said group travel related data.

2. A method of operating a computerized reservation system for travel related services to manage group travel related reservations, the system including a plurality of local computer systems, at least one remote computer system, and at least one remote storage device storing a master inventory of travel related services and a plurality of master passenger name records that correlate individuals with reserved travel related services from said master inventory, the method comprising the computer implemented steps of:

creating at least one group control record including a group inventory of travel related services for a particular group, said group inventory being a subset of said master inventory, and a plurality of group related passenger name records for customers that reserve said travel related services for said particular group, said group related passenger name records being a subset of said master passenger name records, said creating step implemented utilizing said at least one remote computer system;

storing said at least one group control record in said at least one remote storage device;

cross referencing group travel related data in said master inventory, said at least one group control record, and said group related passenger name records to provide cross referencing data among the three, said cross referencing step implemented utilizing said at least one remote computer system; and utilizing said cross referencing data to access and automatically update group travel related data in said master inventory, said group related passenger name records and said at least one group control record responsive to modifications to group travel related data in at least one of the three made using said plurality of local computer systems or said at least one remote computer system, said utilizing step implemented utilizing said at least one remote computer system.

3. The method of claim 2, wherein each of said plurality of group related passenger name records includes a reference to a respective group control record.

4. The method of claim 3, wherein each said group control record includes an index to each one of a related plurality of group related passenger name records.

5. The method of claim 2, wherein each said group control record includes an index to each one of a related plurality of group related passenger name records.

6. The method of claim 1, wherein said modifying step comprises modifying group related data in said master inventory; and wherein said utilizing step comprises utilizing said cross referencing data to access and automatically update group related data in each of said at least one group control record, and then to access and automatically update group related data in each of said plurality of group related passenger name records corresponding to said at least one group control record to reflect said modifications to group related data in said master inventory.

7. The method of claim 2, wherein said creating step further comprises establishing group activity dates for each of said at least one group control record, said method further comprising:

automatically modifying data in said master inventory, and said at least one group control record upon occurrence of respective group activity dates to reflect occurrence of respective group activity dates.

8. The method of claim 2, wherein said creating step includes establishing at least one final date for each of said at least one group control record, said method further comprising:

automatically returning group inventory to said master inventory after occurrence of said at least one final date in a group control record.

9. The method of claim 2, further comprising:

periodically queuing said at least one group control record for subsequent processing.

10. The method of claim 9, wherein said periodic queuing of said at least one group control record includes providing an indication of a requirement for action on said at least one group control record.

11. The method of claim 10, wherein said requirement for action is a manual return of group inventory to said master inventory after occurrence of final dates in said at least one group control record.

12. The method of claim 2, further comprising:

automatically purging each said at least one group control record from said computerized reservation system after expiration of respective final travel dates related to said at least one group control record.

13. The method of claim 2, wherein said creating step further comprises:

creating a temporary group work record including empty data fields related to a group control record;

filling selected empty data fields with information related to a specific group travel offering; and creating a group control record by transferring said group work record fields to corresponding group control record fields.

14. A computerized reservation system for managing group travel related services and for automatically updating modifications to group travel related data, comprising:

means for storing a master inventory of travel related services;

means for storing a plurality of passenger name records;

means for creating a plurality of group control records, each group control record being indicative of a particular group inventory of travel related services and group related passenger name records that are a subset of said plurality of passenger name records for customers that reserve said travel related services from said particular group inventory:

means for storing said plurality of group control records;

means for cross referencing group travel related data in said group related passenger name records, said group control records, and said master inventory to provide cross referencing data among the three;

remote computer controlled means, connected to each of said means for storing and responsive to said means for cross referencing group travel related data, for automatically updating group travel related data in each of said group control records and said respective subset of group related passenger name records responsive to changes to data in said master inventory, for automatically updating group travel related data in said master inventory and respective subsets of group related passenger name records responsive to changes to data in each of said plurality of group records, and for automatically updating group travel related data in said master inventory and respective group control records responsive to changes to data in said plurality of subsets of group related passenger name records; and a plurality of local computer controlled means in electronic communication with said remote computer controlled means for making group reservations and modifying said group travel related data.

* * * * *

UNITED STATES PATENT AND TRADEMARK OFFICE
CERTIFICATE OF CORRECTION

PATENT NO. : 5,648,900
DATED : July 15, 1997
INVENTOR(S) : Bowen et al.

It is certified that error appears in the above-identified patent and that said Letters Patent is hereby corrected as shown below:

In claim 6, column 18, line 62, delete "claim 1" and insert --claim 2-- therefor.

Signed and Sealed this

Twenty-third Day of December, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,648,900
DATED : July 15, 1997
INVENTOR(S) : James D. Bowen et al.

It is certified that error appears in the above-identified patent and that said Letters Patent is hereby corrected as shown below:

In claim 6, column 18, lines 62, 63 and 64 delete "wherein said modifying step comprises modifying group related data in said master inventory; and".

In claim 6, column 18, line 66, after 'group' (first occurrences) insert --travel-- therefor.

In claim 6, column 19, line 1, after 'group', first occurrence, insert --travel-- therefor.

In claim 6, column 19, line 3, after 'group' (second occurrence) inser --travel-- therefor.

Signed and Sealed this

Tenth Day of February, 1998

BRUCE LEHMAN

Attest:

Attesting Officer

Commissioner of Patents and Trademarks